(12) United States Patent
Kodama

(10) Patent No.: US 12,026,502 B2
(45) Date of Patent: Jul. 2, 2024

(54) ONBOARD UPDATE APPARATUS FOR COMMUNICATION WITH AN OUTSIDE-VEHICLE EXTERNAL SERVER THAT PROVIDES AN UPDATE PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Yuichi Kodama, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 121 days.

(21) Appl. No.: 17/756,531

(22) PCT Filed: Nov. 16, 2020

(86) PCT No.: PCT/JP2020/042539
§ 371 (c)(1),
(2) Date: May 26, 2022

(87) PCT Pub. No.: WO2021/106640
PCT Pub. Date: Jun. 3, 2021

(65) Prior Publication Data
US 2022/0413833 A1    Dec. 29, 2022

(30) Foreign Application Priority Data
Nov. 28, 2019  (JP) .................. 2019-215678

(51) Int. Cl.
*G06F 8/65* (2018.01)
*B60L 53/66* (2019.01)
*B60W 50/00* (2006.01)

(52) U.S. Cl.
CPC ............... *G06F 8/65* (2013.01); *B60L 53/66* (2019.02); *B60W 50/00* (2013.01); *B60W 2050/0083* (2013.01); *B60W 2556/45* (2020.02)

(58) Field of Classification Search
None
See application file for complete search history.

(56) References Cited

U.S. PATENT DOCUMENTS

2011/0288765 A1* 11/2011 Conway ........... G08G 1/096816
                                                              701/533
2013/0132939 A1   5/2013 Murata et al.
(Continued)

FOREIGN PATENT DOCUMENTS

JP      2013-50862 A      3/2013
WO   2019-087822 A1    5/2019

OTHER PUBLICATIONS

International Search Report, Application No. PCT/JP2020/042539, mailed Feb. 16, 2021. ISA/Japan Patent Office.

*Primary Examiner* — Qing Chen
(74) *Attorney, Agent, or Firm* — Honigman LLP

(57) ABSTRACT

An onboard update apparatus including a control unit that controls processing for updating a program of an onboard ECU, wherein the onboard update apparatus is communicatively connected to an external server via a plurality of communication paths; the plurality of communication paths include a communication path via a charging control apparatus that controls charging of the vehicle by a charging apparatus outside of the vehicle capable of communication with the external server, and a communication path via an (Continued)

outside-vehicle communication apparatus installed in the vehicle and capable of communication with the external server; the control unit selects one communication path from among the plurality of communication paths; and an update program is acquired from the external server via the communication path selected.

8 Claims, 8 Drawing Sheets

(56) References Cited

U.S. PATENT DOCUMENTS

| | | | |
|---|---|---|---|
| 2013/0193921 A1* | 8/2013 | George | B60L 53/68 320/109 |
| 2014/0312847 A1* | 10/2014 | Chauhdary | B60L 53/31 320/128 |
| 2017/0139778 A1 | 5/2017 | Kito et al. | |
| 2018/0029489 A1* | 2/2018 | Nordbruch | B60L 53/65 |
| 2019/0294135 A1* | 9/2019 | Madrid | G05B 19/0426 |
| 2019/0383637 A1* | 12/2019 | Teske | B60L 53/14 |
| 2020/0233654 A1* | 7/2020 | Matsumoto | G06F 21/606 |

* cited by examiner

Priority order table

| Priority order | Communication path |
|---|---|
| 1 | A |
| 2 | Communication path using power supply line |
| 3 | B |

LEGEND
A= Communication path using wireless communication apparatus
B= Communication path via outside-vehicle communication apparatus

ONBOARD UPDATE APPARATUS FOR COMMUNICATION WITH AN OUTSIDE-VEHICLE EXTERNAL SERVER THAT PROVIDES AN UPDATE PROGRAM

CROSS-REFERENCE TO RELATED APPLICATIONS

This application is the U.S. national stage of PCT/JP2020/042539 filed on Nov. 16, 2020, which claims priority of Japanese Patent Application No. JP 2019-215678 filed on Nov. 28, 2019, the contents of which are incorporated herein.

TECHNICAL FIELD

The present disclosure relates to an onboard update apparatus, an update processing program, and an update method.

BACKGROUND

Onboard electronic control unit (ECU) for controlling onboard devices, such as a powertrain system for engine control, a body system for air conditioner control, and the like, are installed in vehicles. An onboard ECU includes an arithmetic processing unit such as a micro processing unit (MPU), a rewritable, non-volatile storage unit such as a random access memory (RAM), and a communication unit for communicating with other onboard ECUs. The onboard ECU controls onboard devices by reading and executing a control program stored in the storage unit. A relay apparatus (onboard update apparatus) with a wireless communication function is mounted in the vehicle, and, through the relay apparatus, communication is achieved with a program providing apparatus (external server) connected to a network outside of the vehicle. The control program of the onboard ECU can be updated (see JP 2017-97851A, for example) by downloading (receiving) the control program of the onboard ECU from the program providing apparatus.

However, in a case where the wireless communication function provided in the relay apparatus is unavailable, the relay apparatus of JP 2017-97851A cannot communicate with the program providing apparatus connected to the outside-vehicle network and cannot acquire the control program (update program) from the program providing apparatus.

SUMMARY

In light of the foregoing, the present disclosure is directed at provide an onboard update apparatus capable of communication with enhanced availability with an outside-vehicle external server that provides an update program.

An onboard update apparatus according to an aspect of the present disclosure is an onboard update apparatus that acquires an update program transmitted from an external server outside of a vehicle and executes processing for updating a program of an onboard ECU installed in the vehicle including a control unit configured to control the processing for updating the program of the onboard ECU, wherein the onboard update apparatus is communicatively connected to the external server via a plurality of communication paths; the plurality of communication paths include a communication path via a charging control apparatus that controls charging of the vehicle by a charging apparatus outside of the vehicle capable of communication with the external server and a communication path via an outside-vehicle communication apparatus installed in the vehicle and capable of communication with the external server; the control unit selects one communication path from among the plurality of communication paths; and the update program is acquired from the external server via the communication path selected.

Advantageous Effects of Present Disclosure

According to an aspect of the present disclosure, the availability of communication between an onboard update apparatus and an outside-vehicle external server that provides an update program can be enhanced.

DETAILED DESCRIPTION OF PREFERRED EMBODIMENTS

Figure 1:
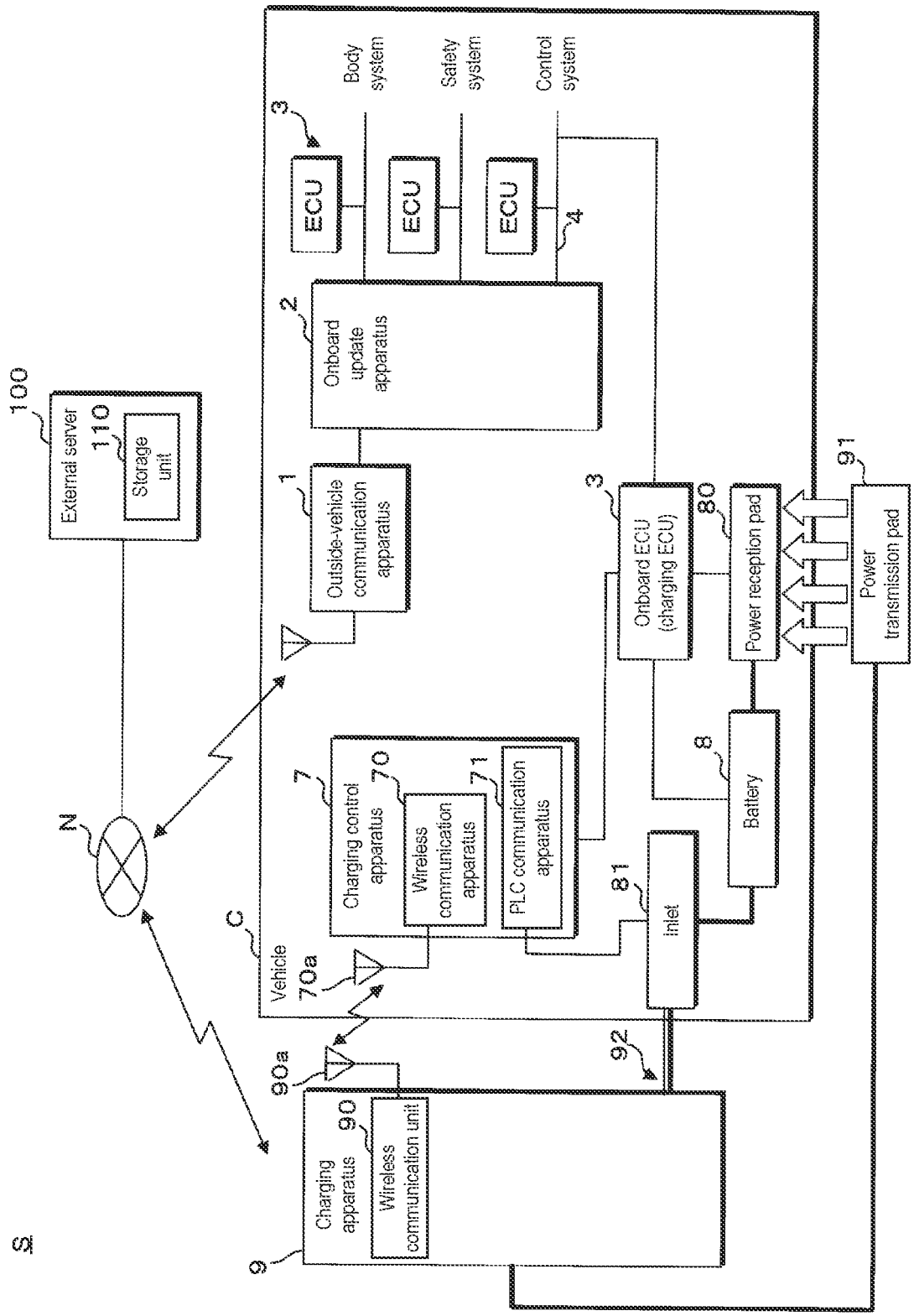
FIG. 1 is a schematic diagram illustrating the configuration of an onboard update system according to a first embodiment.

Firstly, embodiments of the present disclosure will be listed and described. One or more parts of the embodiments described below may be combined in a discretionary manner.

First Aspect

An onboard update apparatus according to a first aspect of the present disclosure is an onboard update apparatus that acquires an update program transmitted from an external server outside of a vehicle and executes processing for updating a program of an onboard ECU installed in the vehicle including a control unit configured to control the processing for updating the program of the onboard ECU, wherein the onboard update apparatus is communicatively connected to the external server via a plurality of communication paths; the plurality of communication paths include a communication path via a charging control apparatus that controls charging of the vehicle by a charging apparatus outside of the vehicle capable of communication with the external server and a communication path via an outside-vehicle communication apparatus installed in the vehicle and capable of communication with the external server; the control unit selects one communication path from among the plurality of communication paths; and the update program is acquired from the external server via the communication path selected.

According to the first aspect, the onboard update apparatus is capable of communication with the external server via the plurality of communication paths including the communication path via the charging control apparatus and the communication path via the outside-vehicle communication apparatus. The outside-vehicle communication apparatus is a telematics control unit (TCU), for example, and wirelessly communicates with the external server. The communication path via the outside-vehicle communication apparatus is a communication path using wireless communication. Communication of the outside-vehicle communication apparatus is a paid communication service provided by the vehicle manufacturer, for example. The control unit can select the communication path via the outside-vehicle communication apparatus, communicate with the external server using the communication path via the outside-vehicle communication apparatus, and acquire the update program. For example, in a case where there is an abnormality in the outside-vehicle communication apparatus or the communication service described above is not contracted, communication via the outside-vehicle communication apparatus cannot be performed. Even in such as case, when the control unit selects the communication path via the charging control apparatus and the vehicle is charged using the charging apparatus, the control unit can communicate with the external server via the charging control apparatus and the charging apparatus and acquire the update program. In a case where the communication with the external server is performed using the communication path via the charging control apparatus, communication costs relating to communication via the outside-vehicle communication apparatus can be saved. Charging the vehicle and updating the program of the onboard ECU can be performed in parallel.

Second Aspect

In the onboard update apparatus according to a second aspect of the present disclosure, the communication path via the charging control apparatus includes a communication path via power line communication using a power supply line connecting the charging control apparatus and the charging apparatus.

According to the second aspect, in order to communicate with the external server, the control unit can select the communication path via power line communication using the power supply line that connects the charging control apparatus and the charging apparatus. The control unit can communicate with the external server via the charging control apparatus and the charging apparatus connected by the power supply line and acquire the update program. Because the charging control apparatus and the charging apparatus have a wired connection via the power supply line, the communication is highly stable.

Third Aspect

In the onboard update apparatus according to a third aspect of the present disclosure, the communication path via the charging control apparatus includes a communication path using a wireless communication apparatus that wirelessly communicates with the charging apparatus and is communicatively connected to the charging control apparatus.

According to the third aspect, in order to communicate with the external server, the control unit can select the communication path using the wireless communication apparatus that wirelessly communicates with the charging apparatus. The charging control apparatus communicates with the charging apparatus via the wireless communication apparatus. For example, in a case where the charging apparatus supplies power to the vehicle C using a non-contact method, the control unit can select the communication path using the wireless communication apparatus, communicate with the external server via the charging control apparatus, the wireless communication apparatus, and the charging apparatus, and acquire the update program.

Fourth Aspect

In the onboard update apparatus according to a fourth aspect of the present disclosure, the control unit acquires information relating to a charge state of the vehicle from the charging control apparatus; and the control unit selects one communication path from among the plurality of communication paths on the basis of the information relating to the charge state acquired.

According to the fourth aspect, the control unit acquires the information relating to the charge state of the vehicle from the charging control apparatus and selects the communication path on the basis of the information relating to the acquired charge state. The information relating to the charge state includes, for example, information relating to the method of supplying power to the vehicle C from the charging apparatus, i.e., information indicating whether the power is supplied via a non-contact method or via the power supply line. For example, in a case where the power is supplied via a non-contact method, the control unit selects the communication path via the wireless communication apparatus. In a case where the power is supplied via the power supply line, the control unit selects the communication path via power line communication. The communication path can be selected in accordance with the method of supplying power to the vehicle C from the charging apparatus.

Fifth Aspect

In the onboard update apparatus according to a fifth aspect of the present disclosure, the information relating to the charge state includes information relating to whether or not the vehicle can be charged; the control unit selects the communication path via the charging control apparatus in a case where the vehicle can be charged; and the control unit selects the communication path via the outside-vehicle communication apparatus in a case where the vehicle cannot be charged.

According to the fifth aspect, the information relating to the charge state includes information relating to whether or not the vehicle can be charged. A case where the vehicle can be charged corresponds to a case where the charging control apparatus and the charging apparatus are connected by the power supply line or a case where the wireless communication apparatus and the charging apparatus are connected by wireless communication, for example. In such a case, the control unit can communicate with the external server using the communication path via the charging control apparatus and thus selects the communication path via the charging control apparatus. In a case where the vehicle cannot be charged, the control unit selects the communication path via the outside-vehicle communication apparatus. The communication path can be selected in accordance with the information relating to whether or not the vehicle can be charged.

Sixth Aspect

In the onboard update apparatus according to a sixth aspect of the present disclosure, when the program of the onboard ECU is updated and the vehicle is charged, the control unit outputs consent screen data constituting a consent screen for receiving consent relating to updating the program of the onboard ECU and consent relating to charging the vehicle; and in a case where consent relating to updating the program of the onboard ECU and consent relating to charging the vehicle is received at the consent screen, the control unit executes processing for updating the program of the onboard ECU and processing for charging the vehicle.

According to the sixth aspect, the control unit outputs the consent screen data constituting the consent screen when the program of the onboard ECU is updated and the vehicle is charged. In a case where consent relating to updating the program of the onboard ECU and consent relating to charging the vehicle are received at the consent screen, the program of the onboard ECU is updated and the vehicle is charged. The program of the onboard update apparatus can be updated and the vehicle can be charged after the user, i.e., the operator of the vehicle, gives consent.

Seventh Aspect

In the onboard update apparatus according to a seventh aspect of the present disclosure, the control unit acquires a state of charge of the vehicle; the control unit executes processing for updating the program of the onboard ECU in a case where the state of charge acquired is equal to or greater than a preset threshold; and the threshold in a case where the onboard ECU which is a target for updating is the onboard ECU relating to charging is less than the threshold in a case where the onboard ECU which is a target for updating is another onboard ECU.

According to the seventh aspect, in a case where the control unit acquires the state of charge of the vehicle and the acquired state of charge is equal to or greater than the threshold, the control unit executes the processing for updating the program of the onboard ECU. The power used to charge the vehicle is used in the processing for updating the program of the onboard ECU. The processing for updating the program of the onboard ECU includes processing to acquire the update program, processing to transmit the update program to the onboard ECU, and the like. In a case where the state of charge is equal to or greater than the threshold, the program of the onboard ECU is updated. This helps prevent the update failing due to insufficient power in the vehicle. The threshold in a case where the target onboard ECU for updating is an onboard ECU relating to charging is less than the threshold in a case where the target onboard ECU for updating is another onboard ECU. In a case where the target onboard ECU for updating is an onboard ECU relating to charging, the program of the onboard ECU can be easily updated.

Eighth Aspect

In the onboard update apparatus according to an eighth aspect of the present disclosure, when the program of the onboard ECU is updated, the control unit outputs first notification data for notifying that the program of the onboard ECU is being updated; and when the vehicle is charged, the control unit outputs second notification data for notifying that the vehicle is being charged.

According to the eighth aspect, when the program of the onboard ECU is updated, the control unit outputs the first notification data. When the vehicle is charged, the control unit outputs the second notification data for notifying that the vehicle is being charged. The output first notification data and the second notification data are acquired via an indicator provided at a position visible from the outside of the vehicle, for example. The indicator is provided with two LED lamps, for example. In a case where the first notification data is acquired, the indicator lights up one LED lamp, and in a case where the second notification data is acquired, the indicator lights up the other LED lamp. By lighting up different combinations of the LED lamps, a person outside of the vehicle can be notified of whether or not the vehicle is being charged and whether or not the program of the onboard ECU is being updated.

Ninth Aspect

An update processing program according to a ninth aspect of the present disclosure is an update processing program that causes a computer to acquire an update program transmitted from an external server outside of a vehicle and execute processing for updating a program of an onboard ECU installed in the vehicle, the computer being caused to execute processing including selecting one communication path from among a plurality of communication paths capable of communicating with the external server, the plurality of communication paths including a communication path via a charging control apparatus that controls charging of the vehicle by a charging apparatus outside of the vehicle capable of communication with the external server and a communication path via an outside-vehicle communication apparatus installed in the vehicle and capable of communication with the external server; and acquiring the update program from the external server via the communication path selected.

According to the ninth aspect, the computer can function as an onboard update apparatus according to an aspect of the present disclosure.

Tenth Aspect

An update method according to a tenth aspect of the present disclosure is an update method for acquiring an update program transmitted from an external server outside of a vehicle and executing processing for updating a program of an onboard ECU installed in the vehicle, the method including selecting one communication path from among a plurality of communication paths capable of communicating with the external server, the plurality of communication paths including a communication path via a charging control apparatus that controls charging of the vehicle by a charging apparatus outside of the vehicle capable of communication with the external server and a communication path via an outside-vehicle communication apparatus installed in the vehicle and capable of communication with the external server; and acquiring the update program from the external server via the communication path selected.

According to the tenth aspect, an update method can be provided that enhances the availability of communication between an onboard update apparatus and an outside-vehicle external server that provides the update program.

The present disclosure will be described in detail below with reference to diagrams of embodiments of the present disclosure. An onboard update apparatus 2 according to an embodiment of the present disclosure will be described with reference to the following diagrams. Note that the present disclosure is not limited to these examples. The present disclosure is defined by the scope of the claims, and all modifications that are equivalent to or within the scope of the claims are included.

First Embodiment

Figure 2:
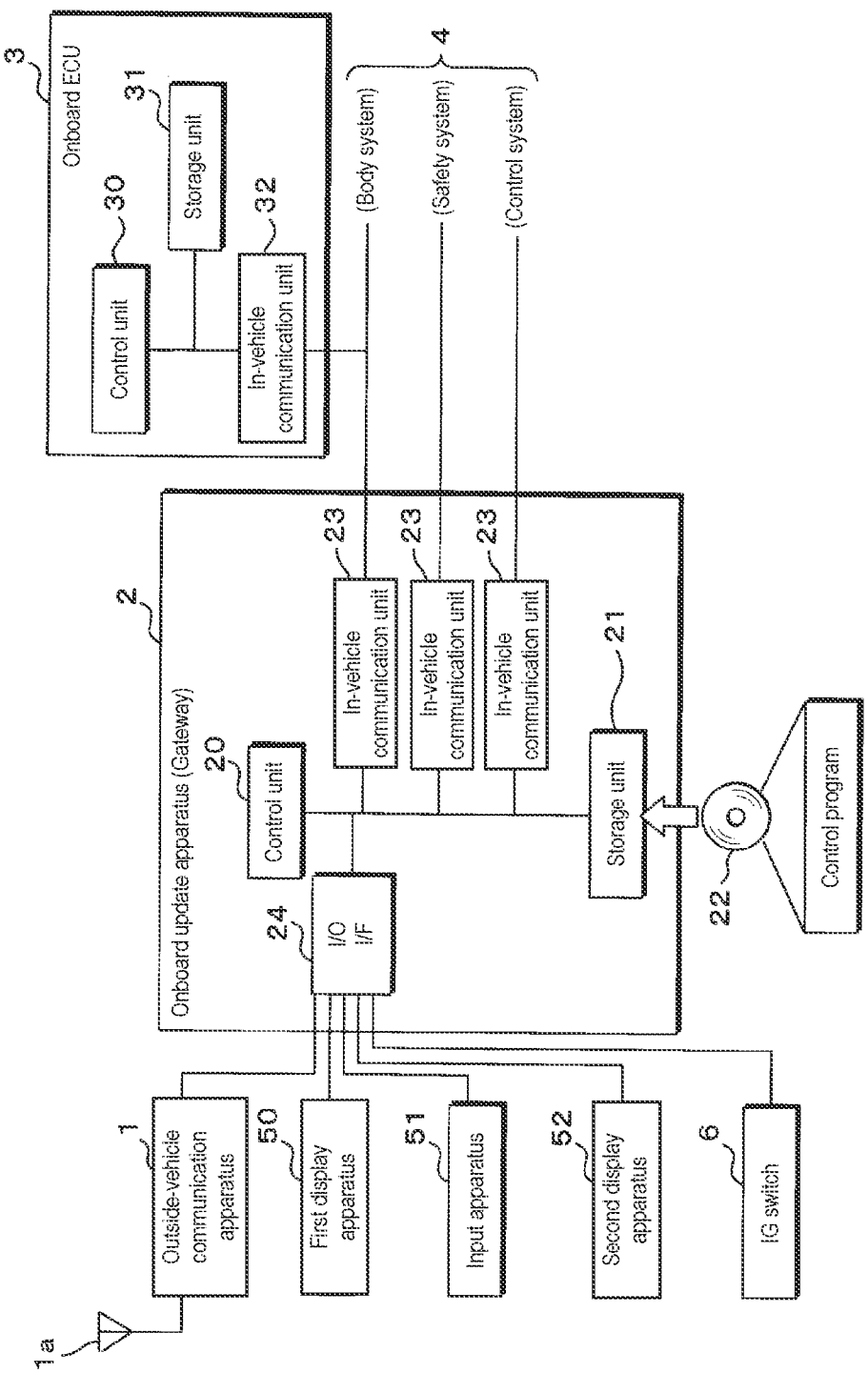
FIG. 2 is a block diagram illustrating the configuration of an onboard update apparatus according to the first embodiment.

An embodiment will be described below with reference to diagrams. FIG. 1 is a schematic diagram illustrating the configuration of an onboard update system S according to the first embodiment. FIG. 2 is a block diagram illustrating the configuration of the onboard update apparatus 2 according to the first embodiment.

The onboard update system S includes the onboard update apparatus (onboard relay apparatus) 2 installed in a vehicle C. The onboard update apparatus 2 communicates with an outside-vehicle communication apparatus 1 and a charging control apparatus 7 installed in the vehicle C. The outside-vehicle communication apparatus 1 communicates with an external server 100 via an outside-vehicle network N. The charging control apparatus 7 communicates with a charging apparatus 9 outside of the vehicle C. The charging apparatus 9 communicates with the external server 100 via the outside-vehicle network N. An update program acquired from the external server 100 via the outside-vehicle network N is adopted by an onboard ECU (onboard control apparatus) 3 installed in the vehicle C to update the program of the onboard ECU 3.

The external server 100 is a computer such as a server connected to the outside-vehicle network N, such as the Internet or a public network and is provided with a storage unit 110 constituted by a random access memory (RAM), a read only memory (ROM), a hard disk, or the like. A program or data for controlling the onboard ECU 3 created by the manufacturer or the like of the onboard ECU 3 is stored in the storage unit 110 of the external server 100. The program or data is, as the update program, transmitted to the vehicle C and used to update the program or data of the onboard ECU 3 installed in the vehicle C. The external server 100 configured as such may also be referred to as an Over-the-Air (OTA) server. The onboard ECU 3 installed in the vehicle C is used as a program for executing the update program transmitted from the external server 100, allowing the program executed by the onboard ECU 3 to be updated (reprogrammed).

The charging apparatus 9 is an apparatus that charges a vehicle-driving battery 8 by transmitting power to the vehicle C, such as a plug-in hybrid vehicle, electric vehicle, or the like, installed with the battery 8. The charging apparatus 9 is placed at a power supply station outside of the vehicle C, for example. The charging apparatus 9 is provided with a power transmission pad 91 that supplies (transmits) power to the vehicle C in a non-contact manner. A power reception pad 80 that receives the power transmitted from the power transmission pad 91 is provided on the vehicle C. The battery 8 is charged by the power received from the power reception pad 80. In other words, the vehicle C is charged. The charging apparatus 9 is provided with a wireless communication unit 90 that communication wirelessly using a communication protocol such as Wi-Fi (registered trademark), Bluetooth (registered trademark), and the like, for example. The wireless communication unit 90 communicates (exchanges data) with the charging control apparatus 7 described below installed in the vehicle C via an antenna 90a connected to the wireless communication unit 90.

The charging apparatus 9 is further provided with a power supply line (charging cable) 92 with a charging gun on the front end portion and has a function of supplying direct current power to the vehicle C via the power supply line 92 and charging the battery 8. When the power supply line 92 is used for charging, the charging gun is connected to an inlet 81 provided on the vehicle C. The inlet 81 is connected to the battery 8 via an in-vehicle power supply line and is connected to a power line communication (PLC) communication apparatus 71 of the charging control apparatus 7 described below via a communication line for performing PLC. The battery 8 is charged by the power supplied from the charging apparatus 9 via the power supply line 92, the inlet 81, and the in-vehicle power supply line. The charging apparatus 9 is capable of wired communication with the charging control apparatus 7 via power line communication using the power supply line 92. The charging apparatus 9 is configured to both supply power (supply power via the power transmission pad 91) in a non-contact manner and supply power via the power supply line 92. However, the charging apparatus 9 may be configured to supply power via only one of these methods. For example, in a case where the charging apparatus 9 only supplies power via the power supply line 92, the wireless communication unit 90 may not be provided. The charging apparatus 9 is provided with a not-illustrated communication apparatus and is capable of communication with the external server 100. The charging apparatus 9 and the external server 100 communicate with one another via the outside-vehicle network N, for example.

A plurality of onboard ECUs 3 are installed in the vehicle C. The onboard ECUs 3 are for controlling the outside-vehicle communication apparatus 1, a first display apparatus 50, an input apparatus 51, a second display apparatus 52, an ignition (IG) switch 6, and various onboard devices. The onboard update apparatus 2 and the outside-vehicle communication apparatus 1 are communicatively connected via a wire harness such as a serial cable, for example. The onboard update apparatus 2 and the onboard ECUs 3 are communicatively connected via an in-vehicle LAN 4 compatible with a communication protocol, such as a controller area network (CAN, registered trademark) or Ethernet (registered trademark).

The outside-vehicle communication apparatus 1 includes an outside-vehicle communication unit (not illustrated) and an I/O (Input/Output) interface (I/F, not illustrated) for communicating with the onboard update apparatus 2. The outside-vehicle communication unit is a communication apparatus for wireless communication using a mobile communications protocol, such as LTE, 4G, 5G, or the like. The outside-vehicle communication unit, for example, performs wireless communication using 3G, LTE, 4G, or 5G and communicates with the external server 100 via an antenna 1a connected to the outside-vehicle communication unit. The communications between the outside-vehicle communication apparatus 1 and the external server 100 are performed via the outside-vehicle network N, such as a public network, the Internet, or the like. For example, wireless communication of the outside-vehicle communication apparatus 1 is a paid communication service provided by the vehicle manufacturer.

The I/O I/F of the outside-vehicle communication apparatus 1 is a communication interface for serial communication with the onboard update apparatus 2, for example. The outside-vehicle communication apparatus 1 and the onboard update apparatus 2 communicate with one another via a wire harness such as a serial cable connected to the I/O I/F and the I/O I/F. In the present embodiment, the outside-vehicle communication apparatus 1 is a separate apparatus from the onboard update apparatus 2 and is communicatively connected thereto via the I/O I/F or the like. However, no such limitation is intended. The outside-vehicle communication apparatus 1 may be built-in the onboard update apparatus 2 as a component of the onboard update apparatus 2.

The onboard update apparatus 2 is capable of communication with the external server 100 via a plurality of communication paths. The plurality of communication paths include a communication path via the outside-vehicle communication apparatus 1 and a communication path via the charging control apparatus 7 described below. The onboard update apparatus 2 includes a control unit 20, a storage unit 21, an in-vehicle communication unit 23, and an I/O I/F 24. The onboard update apparatus 2 acquires, from the outside-vehicle communication apparatus 1, the update program received by the outside-vehicle communication apparatus 1 from the external server 100 via wireless communication. The onboard update apparatus 2 is configured to transmit the update program via the in-vehicle LAN 4 to a predetermined onboard ECU 3 (target onboard ECU 3 for updating). The onboard update apparatus 2, for example, is a gateway (relay device) that controls segments of a plurality of systems, such as the onboard ECU 3 of a control system, the onboard ECU 3 of a safety system, the onboard ECU 3 of a body system, and the like and relays communications between the onboard ECUs 3 of these segments. Also, the onboard update apparatus 2 may be configured as a functional unit of the body ECU that controls the entire vehicle C.

The control unit 20 is constituted by a central processing unit (CPU), an MPU, or the like and executes various types of control processing and calculation processing by reading out and executing a control program and data stored in advance in the storage unit 21.

The control unit 20 controls the processing for updating the program of the onboard ECU 3 by executing the control program stored in the storage unit 21. The processing for updating the program of the onboard ECU 3 includes processing to acquire the update program, processing to transmit the update program to the target onboard ECU 3 for updating, and the like, for example. By the control unit 20 executing the control program stored in the storage unit 21, the control unit 20 functions as a selection unit that selects any communication path from among the plurality of communication paths with the external server 100. By the control unit 20 executing the control program stored in the storage unit 21, the control unit 20 functions as a first acquisition unit that acquires the update program from the external server 100 via the selected communication path. By the control unit 20 executing the control program stored in the storage unit 21, the control unit 20 functions as a second acquisition unit that acquires information relating to the charge state described below of the vehicle C from the charging control apparatus 7. By the control unit 20 executing the control program stored in the storage unit 21, the control unit 20 functions as a first output unit that outputs consent screen data described below when the program of the onboard ECU 3 is updated and the vehicle C is charged. By the control unit 20 executing the control program stored in the storage unit 21, the control unit 20 functions as a second output unit that outputs first notification data for notifying that the program of the onboard ECU 3 is being updated when the program of the onboard ECU 3 is updated. By the control unit 20 executing the control program stored in the storage unit 21, the control unit 20 functions as a third output unit that outputs second notification data for notifying that the vehicle C is being charged when the vehicle C is charged.

The storage unit 21 is constituted by a volatile memory element such as RAM or a non-volatile memory element, such as ROM, electrically erasable programmable ROM (EEPROM), flash memory, or the like. The control program is stored in advance in the storage unit 21. The control program stored in the storage unit 21 may be a control program read out from a storage medium 22 readable by the onboard update apparatus 2. Also, the control program may be a control program downloaded from a non-illustrated external computer connected to a non-illustrated communication network and stored in the storage unit 21.

The in-vehicle communication unit 23 is an I/O interface that uses a communication protocol, such as CAN, Ethernet, or the like. The control unit 20 communicates with the onboard ECU 3 connected to the in-vehicle LAN 4 via the in-vehicle communication unit 23 or an onboard device of another relay apparatus or the like. A plurality (three in the diagram) of the in-vehicle communication units 23 are provided. A communication line constituting the in-vehicle LAN 4 is connected to each one of the in-vehicle communication units 23. By providing a plurality of the in-vehicle communication units 23 in this manner, the in-vehicle LAN 4 can be divided in a plurality of segments. The onboard ECU 3 connects to the segment in accordance with the function (control system function, safety system function, body system function) of the onboard ECU 3.

As with the I/O I/F of the outside-vehicle communication apparatus 1, the I/O I/F 24 is a communication interface for serial communication, for example. The onboard update apparatus 2 communicates with the outside-vehicle communication apparatus 1, the first display apparatus 50, the input apparatus 51, the second display apparatus 52, and the IG switch 6 via the I/O I/F 24.

The first display apparatus 50 is a human machine interface (HMI) apparatus such as a car navigation display, for example. The first display apparatus 50 is communicatively connected to the I/O I/F 24 of the onboard update apparatus 2 via a harness such as a serial cable or the like. Data or information output from the control unit 20 of the onboard update apparatus 2 via the I/O I/F 24 is displayed on the first display apparatus 50. The input apparatus 51 is a touch panel, for example, and is communicatively connected to the I/O I/F 24 of the onboard update apparatus 2 via a harness such as a serial cable or the like. The input apparatus 51 receives input from an occupant of the vehicle C, for example, the operator of the vehicle C, and outputs the input result to the control unit 20 via the I/O I/F 24. The first display apparatus 50 and the input apparatus 51 may be integrally formed. The mode of connection between the first display apparatus 50 and the input apparatus 51 and the onboard update apparatus 2 is not limited to being connected via the I/O I/F 24, and the first display apparatus 50 and the input apparatus 51 and the onboard update apparatus 2 may be connected via the in-vehicle LAN 4.

The second display apparatus 52 is an indicator constituted by a plurality of LED lamps, for example, and is attached at a position that is visible from the outside of the vehicle C. The position visible from the outside of the vehicle C is, for example, on the upper portion of the dashboard of the vehicle C or outside of the side surface portion of the vehicle C. The second display apparatus 52 is communicatively connected to the I/O I/F 24 of the onboard update apparatus 2 via a harness such as a serial cable or the like. The second display apparatus 52 receives (acquires) the first notification data and the second notification data output from the control unit 20 of the onboard update apparatus 2 via the I/O I/F 24. For example, when the second display apparatus 52 acquires the first notification data, one or more LED lamps light up. This will be described in further detail below. When the second display apparatus 52 acquires the second notification data, another LED lamp lights up. By lighting up different combinations of LEDs, the second display apparatus 52 can notify a person outside of the vehicle C, for example, a user outside of the vehicle C, that the vehicle C is being charged and that the program of the onboard ECU 3 is being updated. The mode of connection between the second display apparatus 52 and the onboard update apparatus 2 is not limited to being connected via the I/O I/F 24, and the second display apparatus 52 and the onboard update apparatus 2 may be connected via the in-vehicle LAN 4.

The IG switch 6 is a switch for switching between operation states of the prime mover (not illustrated) such as the engine of the vehicle C. For example, the operator of the vehicle C switches the IG switch 6 from off to on to activate the vehicle C and start driving the vehicle C. Then, when the operator of the vehicle C has finished driving the vehicle C, the operator switches the IG switch 6 from on to off and stops the vehicle C. The IG switch 6 is communicatively connected to the I/O I/F 24 of the onboard update apparatus 2 via a harness such as a serial cable or the like. The switch state (on or off) of the IG switch 6 is reported to the control unit 20 of the onboard update apparatus 2 via the I/O I/F 24. For example, a signal indicating whether the IG switch 6 is on or off is input from the IG switch 6 to the control unit 20 of the onboard update apparatus 2 via the I/O I/F 24. The mode of connection between the IG switch 6 and the onboard update apparatus 2 is not limited to being connected via the I/O I/F 24, and the IG switch 6 and the onboard update apparatus 2 may be connected via the in-vehicle LAN 4.

The onboard ECU 3 includes a control unit 30, the storage unit 31, and an in-vehicle communication unit 32. The storage unit 31 is constituted by a volatile memory element such as RAM or a non-volatile memory element, such as ROM, EEPROM, flash memory, or the like. A program or data of the onboard ECU 3 is stored in the storage unit 31. The program or data is the target for updating by the update program transmitted from the onboard update apparatus 2.

The storage unit 31 may include a first storage area (first surface) and a second storage area (second surface). In this case, two programs, a program (current version) currently executed (adopted) by the onboard ECU 3 and a program (previous version) adopted prior to the current version, are stored in the storage unit 31. The current version of the program and the previous version of the program are divided between the storage areas, i.e., the first storage area and the second storage area, and stored. In other words, in a case where the current version of the program is stored in the first storage area, the previous version of the program is stored in the second storage area. In a case where the previous version of the program is stored in the first storage area, the current version of the program is stored in the second storage area. In a case where the storage unit 31 includes the first storage area and the second storage area, the two programs, i.e., the current version of the program and the previous version of the program, are stored in the form of a so-called "two region storage". Accordingly, even in a case where a problem occurs in the current version of the program, the control unit 30 loads the previous version of the program adopted previously that operated normally and executes (switches to) the program. This allows the reliability of the onboard ECU 3 to be ensured. Hereinafter, a case in which the storage unit 31 includes the first storage area and the second storage area is referred to as the storage unit 31 having two region storage, and a case in which the storage unit 31 includes either the first storage area or the second storage area is referred to as the storage unit 31 having one region storage.

In a case where the storage unit 31 has two region storage, information relating to the versions of the two programs, i.e., the current version and the previous version, and information relating to the area (operation region) storing the program currently being executed (adopted) are stored in the storage unit 31. In other words, in a case where the program stored in the first storage area is currently being executed, the storage unit 31 uses the first storage area as the operation region. In a case where the program stored in the second storage area is currently being executed, the storage unit 31 uses the second storage area as the operation region. Program version (current version and previous version) information and information relating to the operation region are stored in the storage unit 31.

The control unit 30 is constituted by a CPU, an MPU, or the like. The control unit 30 reads out and executes a program and data stored in the storage unit 31 (in a case where the storage unit 31 has two region storage, the operation region of the storage unit 31), executes control processing and the like, and controls the onboard device, actuator, or the like including the onboard ECU 3.

The control unit 30 of the onboard ECU 3 receives the update program transmitted from the onboard update apparatus 2 via the in-vehicle communication unit 32 and acquires the update program. In a case where the storage unit 31 has one region storage, the update program is adopted by the control unit 30 storing the acquired update program in the storage unit 31. In other words, the program of the onboard ECU 3 is updated. For the update program transmitted from the onboard update apparatus 2 to be acquired, the control unit 30, as part of processing to prepare for acquisition, deletes the program (current version of the program) stored in the storage unit 31. To delete the program, the control function of the onboard ECU 3 with respect to the onboard apparatus must be stopped. In a case where the storage unit 31 has two region storage, the control unit 30 stores the acquired update program in the storage area which is not the operation region (non-operation region). In other words, for the update program transmitted from the onboard update apparatus 2 to be acquired, the control unit 30, as part of processing to prepare for acquisition, deletes the program stored in the non-operation region. Typically, the program stored in the non-operation region is the previous version of the program executed prior to the current version of the program. Accordingly, without stopping the control function of the onboard ECU 3 with respect to the onboard apparatus, the control unit 30 deletes the previous version of the program and stores the update program transmitted from the onboard update apparatus 2 in the non-operation region. By the control unit 30 switching between the operation region and the non-operation region of the storage unit 31, the received (stored) update program is adopted as the current version of the program. In other words, the program of the onboard ECU 3 is updated.

The charging control apparatus 7 is provided with a wireless communication apparatus 70 and a PLC communication apparatus 71. The wireless communication apparatus 70 is a communication apparatus for performing wireless communication using a communication protocol such as Wi-Fi, Bluetooth, and the like, for example. The wireless communication apparatus 70 wirelessly communicates with the charging apparatus 9 via an antenna 70a connected to the wireless communication apparatus 70. The wireless communication apparatus 70 performs protocol conversion from Wi-FI to CAN or Ethernet, for example. In a case where the charging gun is connected to the inlet 81, the PLC communication apparatus 71 performs power line communication with the charging apparatus 9 via the inlet 81 and the power supply line 92. The PLC communication apparatus 71 performs protocol conversion from the communication protocol of the power line communication to CAN or Ethernet, for example. The charging control apparatus 7 wirelessly communicates with the charging apparatus 9 via the wireless communication apparatus 70. The charging control apparatus 7 also communicates with the charging apparatus 9 via power line communication using the PLC communication apparatus 71. In the present embodiment, the wireless communication apparatus 70 and the PLC communication apparatus 71 are built-in the charging control apparatus 7 as components of the charging control apparatus 7. However, the wireless communication apparatus 70 and the PLC communication apparatus 71 may not be built-in the charging control apparatus 7. For example, both the wireless communication apparatus 70 and the PLC communication apparatus 71 may be separate apparatuses from the charging control apparatus 7 and may be communicatively connected to the charging control apparatus 7 via an I/O I/F or the like.

The charging control apparatus 7 is communicatively connected to the charging ECU, which is at least one of the plurality of onboard ECUs 3. The charging ECU is the onboard ECU 3 involved with charging and is connected to the battery 8 and the power reception pad 80, for example. The charging ECU, for example, transmits battery 8 information to the charging control apparatus 7 when the battery 8 is started to be charged, monitors the charge information, such as the state of charge (SOC), of the battery 8 when the battery 8 is being charged, and transmits the charge information to the charging control apparatus 7. Also, the power supply (charging) from the power reception pad 80 to the battery 8 is monitored (managed). The charging control apparatus 7 performs wireless communication or power line communication with the charging apparatus 9 and controls the charging (charging of the vehicle C) of the battery 8 together with the charging ECU. In a case where the power supply line 92 is used to supply power (charge), for example, the charging control apparatus 7 performs power line communication with the charging apparatus 9 via the power supply line 92. In a case where a non-contact method is used to supply power (charge), the charging control apparatus 7 wirelessly communicates with the charging apparatus 9 using the wireless communication apparatus 70. Even in a case where the power supply line 92 is used to supply power, the charging control apparatus 7 may wirelessly communicate with the charging apparatus 9 using the wireless communication apparatus 70. A plurality of charging ECUs may be installed in the vehicle C. For example, a charging ECU that manages the battery 8 and a charging ECU that manages the power reception pad 80 may each be connected to the charging control apparatus 7. The charging ECU may be installed in the charging control apparatus 7. In the example illustrated in FIG. 1, the charging ECU is included in a segment of the control system. However, the charging ECU may be included in another segment of the body system, the safety system, or the like.

The charging control apparatus 7 is capable of communication with the onboard update apparatus 2. In the example illustrated FIG. 1, the charging control apparatus 7 communicates with the onboard update apparatus 2 via the charging ECU and the in-vehicle LAN 4. The onboard update apparatus 2 and the charging control apparatus 7 may be connected via the in-vehicle LAN 4 and communicate with one another, for example. After the battery 8 has finished charging, the charging control apparatus 7 transmits a charge complete notification to the onboard update apparatus 2.

The onboard update apparatus 2 is capable of communication with the external server 100 using the communication path via the charging control apparatus 7, the PLC communication apparatus 71, the power supply line 92, and the charging apparatus 9. The communication path via the charging control apparatus 7, the PLC communication apparatus 71, the power supply line 92, and the charging apparatus 9 corresponds to the communication path via power line communication using the power supply line 92. Hereinafter, the communication path via power line communication using the power supply line 92 is also referred to as the communication path using the power supply line 92. The onboard update apparatus 2 is capable of communication with the external server 100 using the communication path via the charging control apparatus 7, the wireless communication apparatus 70, and the charging apparatus 9. The communication path via the charging control apparatus 7, the wireless communication apparatus 70, and the charging apparatus 9 corresponds to the communication path using the wireless communication apparatus 70. The communication path via power line communication using the power supply line 92 and the communication path using the wireless communication apparatus 70 are included in the communication path via the charging control apparatus 7.

Figure 3:
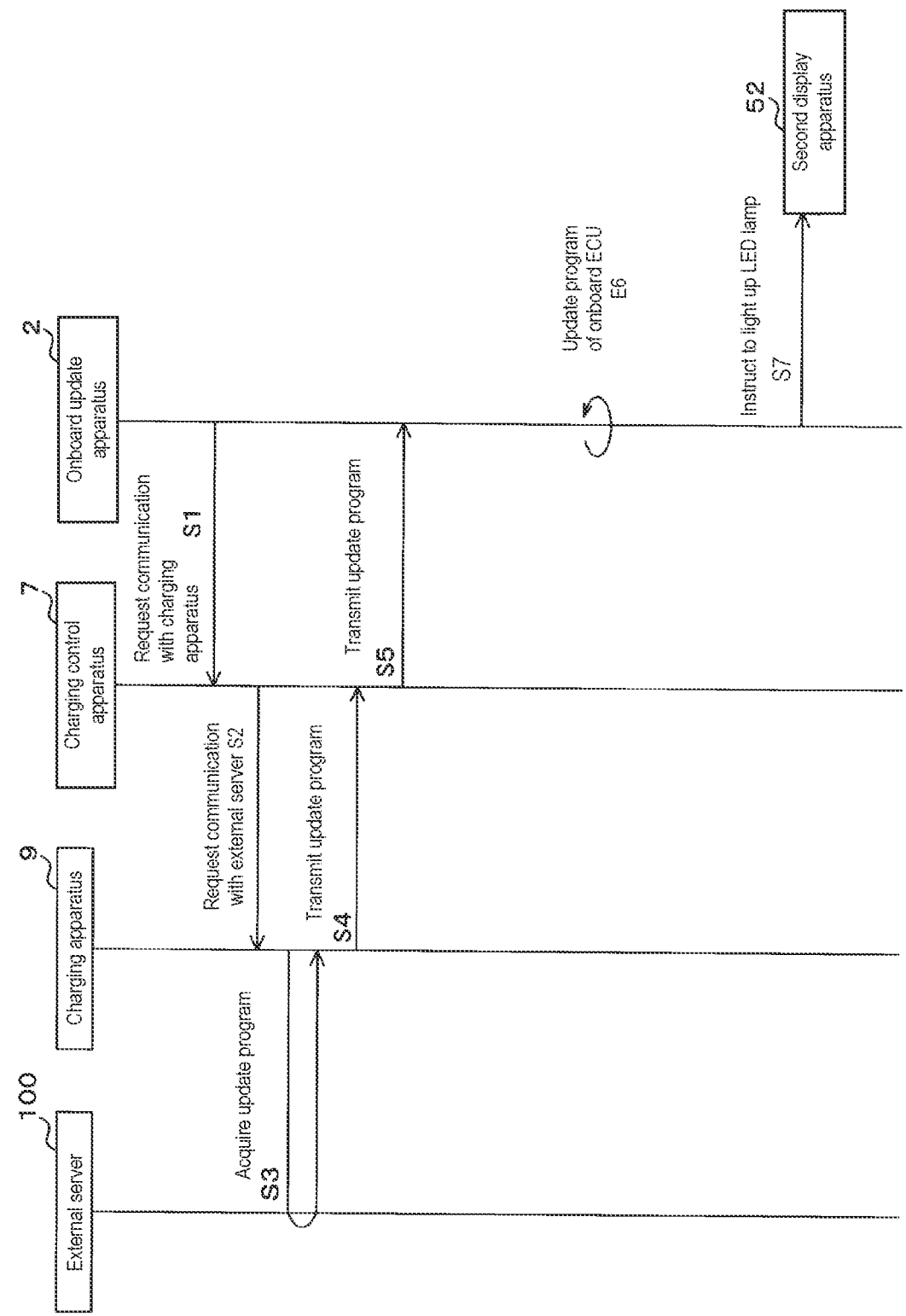
FIG. 3 is an explanatory diagram (sequence diagram) illustrating a mode of updating a program of a target onboard ECU for updating via the onboard update apparatus.
Figure 4:
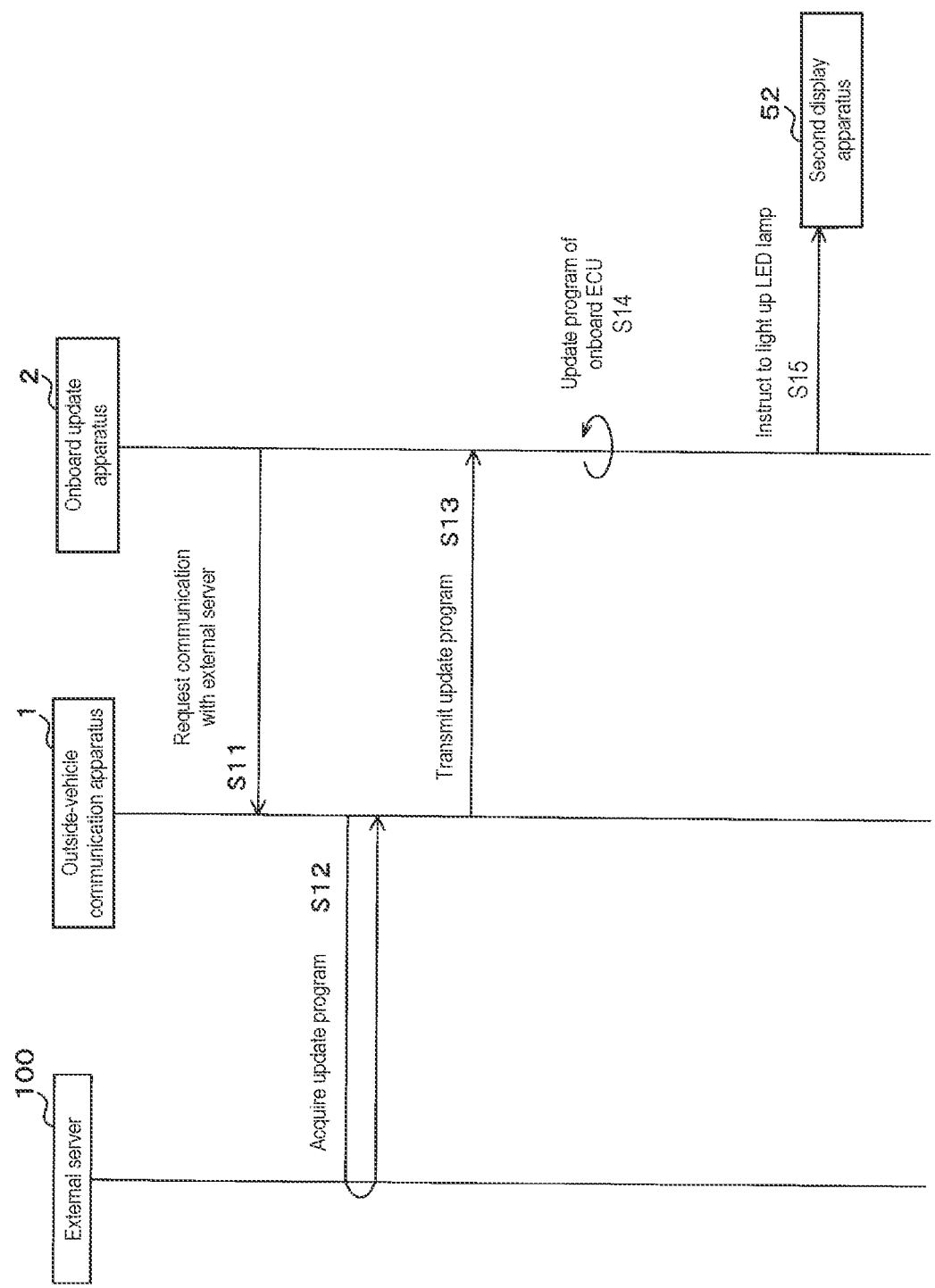
FIG. 4 is an explanatory diagram (sequence diagram) illustrating a mode of updating the program of the target onboard ECU for updating via the onboard update apparatus.

FIGS. 3 and 4 are explanatory diagrams (sequence diagrams) illustrating a mode of updating the program of the target onboard ECU 3 for updating via the onboard update apparatus 2. For example, in a case where the vehicle C is activated (the IG switch 6 is on), the onboard update apparatus 2 periodically or non-periodically communicates with the external server 100 via the outside-vehicle communication apparatus 1. In a case where a program or data for updating, in other words an update program, is prepared in the external server 100, the onboard update apparatus 2 receives (acquires) an update notification from the external server 100. In a case where the IG switch 6 is switched off after the update notification is received, the onboard update apparatus 2 selects one of the communication paths from among the plurality of communication paths on the basis of a predetermined selection condition and executes the following processing. Selection of the communication path will be described in detail below. Even in a case where an update notification has not been received from the external server 100 when the vehicle C is activated, when the IG switch 6 is switched off, the onboard update apparatus 2 may select one of the communication paths from among the plurality of communication paths and execute the following processing.

FIG. 3 is a diagram illustrating a mode of the program update performed when, from among the plurality of communication paths, the communication path via the charging control apparatus 7 is selected. FIG. 3 is a sequence diagram for describing the processing of the external server 100, the charging apparatus 9, and the charging control apparatus 7 executing processing to update the program of the target onboard ECU 3 for updating in a case where the communication path via the charging control apparatus 7 is selected by the onboard update apparatus 2. Hereinafter, the term "step" is abbreviated to "S".

From among the communication paths via the charging control apparatus 7, the onboard update apparatus 2 selects either the communication path via power line communication using the power supply line 92 or the communication path using the wireless communication apparatus 70. More details will be described below. The onboard update apparatus 2 requests for communication with the charging apparatus 9 corresponding to the selected communication path to the charging control apparatus 7 (S1). In a case where the onboard update apparatus 2 has selected the communication path via power line communication using the power supply line 92, the charging control apparatus 7 is requested to communicate with the charging apparatus 9 via the PLC communication apparatus 71. In a case where the onboard update apparatus 2 has selected the communication path using the wireless communication apparatus 70, the charging control apparatus 7 is requested to communicate with the charging apparatus 9 via the wireless communication apparatus 70.

The charging control apparatus 7 communicates with the charging apparatus 9 via the PLC communication apparatus 71 or the wireless communication apparatus 70. The charging control apparatus 7 requests the charging apparatus 9 to communicate with the external server 100 (S2). The charging apparatus 9 communicates with the external server 100 and acquires the update program from the external server 100 (S3). In a case where the onboard update apparatus 2 does not acquire the update notification from the external server 100, the charging apparatus 9 communicates with the external server 100 and confirms whether or not there is an update program. In a case where there is an update program in the external server 100, the charging apparatus 9 acquires the update program.

The charging apparatus 9 transmits the acquired update program to the charging control apparatus 7 (S4). The charging control apparatus 7 acquires the update program transmitted from the charging apparatus 9 via the PLC communication apparatus 71 or the wireless communication apparatus 70 and transmits the acquired update program to the onboard update apparatus 2 (S5).

The onboard update apparatus 2 acquires the update program transmitted from the charging control apparatus 7 and updates the program of the target onboard ECU 3 for updating (S6). Specifically, in a case where the target onboard ECU 3 for updating has one region storage, the onboard update apparatus 2 stores the acquired update program in the storage unit 21. In a case where the operator of the vehicle C, for example, inputs consent for update of the program of the onboard ECU 3, the onboard update apparatus 2 transmits the update program in the storage unit 21 to the target onboard ECU 3 for updating. The transmitted update program is stored in the storage unit 31 and adopted by the onboard ECU 3. In other words, the program of the onboard ECU 3 is updated. In a case where the target onboard ECU 3 for updating has two region storage, the onboard update apparatus 2 transmits the acquired update program to the target onboard ECU 3 for updating. The transmitted update program is stored in the non-operation region of the storage unit 31. In a case where the operator of the vehicle C, for example, inputs consent for update of the program of the onboard ECU 3, the onboard update apparatus 2 causes the onboard ECU 3 to switch between the operation region and the non-operation region of the storage unit 31. In other words, the program of the onboard ECU 3 is updated. The onboard update apparatus 2 outputs the first notification data to the second display apparatus 52 and instructs the second display apparatus 52 to light up the LED lamp (S7). This will be described in further detail below. Lighting up the LED lamp notifies that the program of the onboard ECU 3 is being updated. After the program has finished being updated, the onboard ECU 3 transmits an update complete notification to the onboard update apparatus 2.

FIG. 4 is a diagram illustrating a mode of the program update performed when the communication path via the outside-vehicle communication apparatus 1 is selected. FIG. 4 is a sequence diagram for describing the processing of the external server 100 and the outside-vehicle communication apparatus 1 executing processing to update the program of the target onboard ECU 3 for updating in a case where the communication path via the outside-vehicle communication apparatus 1 is selected by the onboard update apparatus 2.

The onboard update apparatus 2 requests the outside-vehicle communication apparatus 1 to communicate with the external server 100 (S11). The outside-vehicle communication apparatus 1 communicates with the external server 100 via the outside-vehicle network N and acquires the update program from the external server 100 (S12). In a case where the onboard update apparatus 2 does not acquire the update notification from the external server 100, the outside-vehicle communication apparatus 1 communicates with the external server 100 and confirms whether or not there is an update program. In a case where there is an update program in the external server 100, the outside-vehicle communication apparatus 1 acquires the update program.

The outside-vehicle communication apparatus 1 transmits the acquired update program to the onboard update apparatus 2 (S13). The onboard update apparatus 2 acquires the update program transmitted from the outside-vehicle communication apparatus 1 and updates the program of the target onboard ECU 3 for updating (S14). The processing of S14 is similar to the processing of S6 described above. Thus, description of the processing of S14 will be omitted. The onboard update apparatus 2 outputs the first notification data to the second display apparatus 52 and instructs the second display apparatus 52 to light up the LED lamp (S15). This will be described in further detail below. Lighting up the LED lamp notifies that the program of the onboard ECU 3 is being updated. After the program has finished being updated, the onboard ECU 3 transmits an update complete notification to the onboard update apparatus 2.

Figure 5:
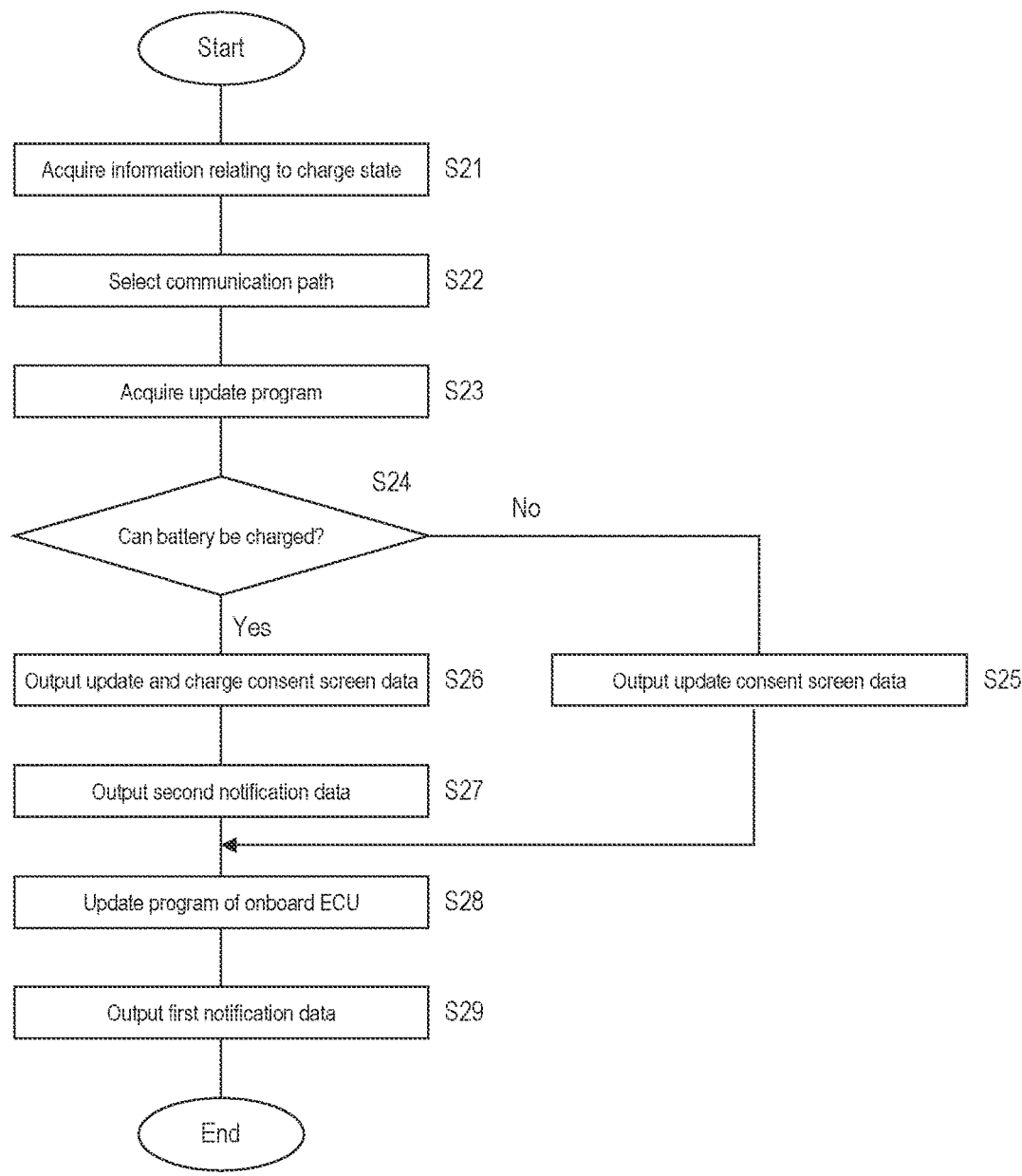
FIG. 5 is a flowchart illustrating an example of the main routine of the processing relating to updating the program of the target onboard ECU for updating executed by a control unit of the onboard update apparatus.
Figure 6:
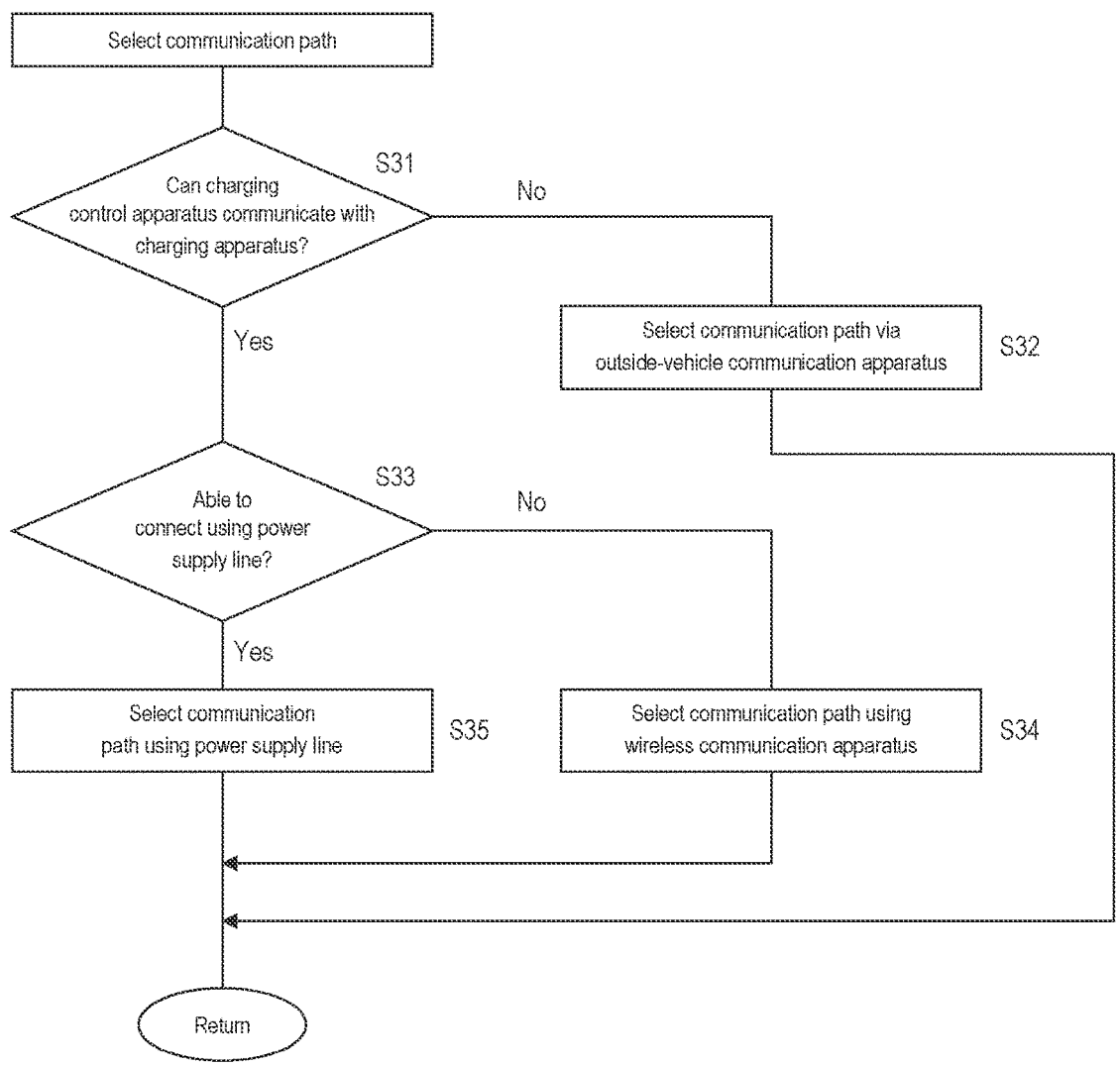
FIG. 6 is a flowchart illustrating an example of the processing process of the control unit relating to a subroutine for selecting a communication path.
Figures 7, 8:
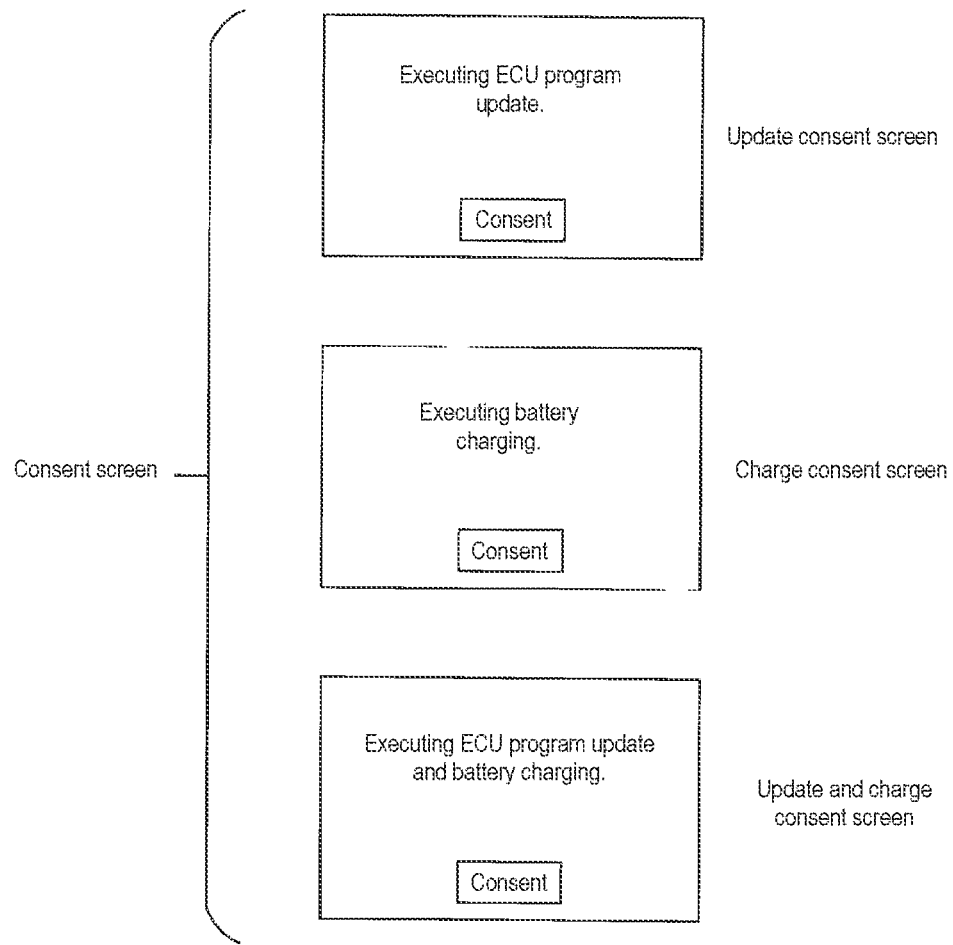
FIG. 7 is a conceptual diagram illustrating an example of the contents of a consent screen.
FIG. 8 is a conceptual diagram illustrating an example of the contents of a priority order table.

FIG. 5 is a flowchart illustrating an example of the main routine of the processing relating to updating the program of the target onboard ECU 3 for updating executed by the control unit 20 of the onboard update apparatus 2. FIG. 6 is a flowchart illustrating an example of the processing process of the control unit 20 relating to a subroutine for selecting the communication path. FIG. 7 is a conceptual diagram illustrating an example of the contents of a consent screen. The consent screen is a screen for receiving consent (consent for updating) relating to updating the program of the onboard ECU 3 and consent (consent for charging) relating to charging the vehicle C when the program of the onboard ECU 3 is updated and when the vehicle C is charged. The details will be described below. The consent screen is constituted by consent screen data. The consent screen includes three screens, i.e., an update consent screen that receives consent for updating, a charge consent screen that receives consent for charging, and an update and charge consent screen that simultaneously receives consent for updating and charging.

In a case where the vehicle C is activated (the IG switch 6 is on), the control unit 20 of the onboard update apparatus 2 periodically or non-periodically communicates with the external server 100 via the outside-vehicle communication apparatus 1. In a case where a program or data to be updated, i.e., the update program, is prepared in the external server 100, the control unit 20 executes the following processing. Alternatively, the control unit 20 may execute the following processing on the basis of an update notification from the external server 100 acquired via the outside-vehicle communication apparatus 1. The control unit 20 may execute the following processing on the basis of an update notification being displayed on the first display apparatus 50 and consent for update being entered by the operator of the vehicle C via the input apparatus 51. For example, in a case where the communication service for wireless communication of the outside-vehicle communication apparatus 1 is uncontracted, the control unit 20 may execute the following processing when the IG switch 6 is switched from on to off. Even in a case where an update notification has not been received from the external server 100 when the vehicle C is activated, the control unit 20 may execute the following processing when the IG switch 6 is switched from on to off.

When the IG switch 6 is switched to off, the control unit 20 acquires information relating to the charge state from the charging control apparatus 7 (S21). The information relating to the charge state includes information relating to whether or not the battery 8 can be charged, in other words, whether or not the vehicle C can be charged. In a case where the battery 8 can be charged (ready to be charged), the control unit 20 acquires information indicating that the battery 8 can be charged. Hereinafter, a case where the battery 8 can be charged may also be referred to as a case where the vehicle C can be charged. In a case where the vehicle C can be charged, for example, a connection between the vehicle C (the charging control apparatus 7) and the charging apparatus 9 via the power supply line 92 may be established and/or communication between the wireless communication apparatus 70 and the charging apparatus 9 may be established. In a case where communication between the wireless communication apparatus 70 and the wireless communication unit 90 of the charging apparatus 9 is established, the vehicle C (the charging control apparatus 7) and the charging apparatus 9 are connected via wireless communication. In a case where communication between the wireless communication apparatus 70 and the wireless communication unit 90 of the charging apparatus 9 is established, for example, the vehicle C is positioned at a location where power can be transmitted from the power transmission pad 91 to the power reception pad 80. Communication between the wireless communication apparatus 70 and the charging apparatus 9 is automatically established in a case where the vehicle C is located within the communication zone of the wireless communication unit 90 of the charging apparatus 9. Communication between the wireless communication apparatus 70 and the charging apparatus 9 may be established via an operation by the operator of the vehicle C. In a case where the battery 8 cannot be charged (not ready to be charged), the control unit 20 acquires information indicating that the battery 8 cannot be charged. Hereinafter, a case where the battery 8 cannot be charged may also be referred to as a case where the vehicle C cannot be charged. In a case where the vehicle C cannot be charged, for example, neither a connection between the vehicle C and the charging apparatus 9 via the power supply line 92 nor communication between the wireless communication apparatus 70 and the wireless communication unit 90 of the charging apparatus 9 are established. The information relating to the charge state further includes information indicating whether or not the vehicle C and the charging apparatus 9 are connected via the power supply line 92 (whether or not the charging gun is connected to the inlet 81) and information indicating whether or not communication between the wireless communication apparatus 70 and the charging apparatus 9 is established.

The control unit 20 calls the subroutine for selecting the communication path (S22) and selects the communication path from among the plurality of communication paths on the basis of the acquired information relating to the charge state. The processing relating to the subroutine for selecting the communication path executed by the control unit 20 will be described below using FIG. 6.

The control unit 20 determines whether or not the charging control apparatus 7 can communicate with the charging apparatus 9 on the basis of the acquired information relating to the charge state (S31). In a case where the charging control apparatus 7 cannot communicate with the charging apparatus 9 (no in S31), the control unit 20 selects the communication path via the outside-vehicle communication apparatus 1 (S32) and returns to the main routine. In a case where charging control apparatus 7 cannot communicate with the charging apparatus 9, for example, neither a connection between the vehicle C and the charging apparatus 9 via the power supply line 92 nor communication between the wireless communication apparatus 70 and the charging apparatus 9 are established, this corresponding to a case where the vehicle C cannot be charged.

In a case where communication by the outside-vehicle communication apparatus 1 is achieved via a paid communication service, the control unit 20 may take into account the current communication amount of the outside-vehicle communication apparatus 1 and the data amount of the update program when selecting the communication path via the outside-vehicle communication apparatus 1. In a case where the communication amount per month for the outside-vehicle communication apparatus 1 is stored in the storage unit 21, for example, the control unit 20 may compare the current communication amount and the preset communication amount threshold. In a case where the current communication amount is less than the communication amount threshold, the control unit 20 selects the communication path via the outside-vehicle communication apparatus 1. For example, in a case where information relating to the data amount of the update program is included in the update notification transmitted from the external server 100, the control unit 20 may compare the data amount of the update program relating to the update notification and the preset data amount threshold. In a case where the data amount of the update program relating to the update notification is less than the data amount threshold, the control unit 20 selects the communication path via the outside-vehicle communication apparatus 1. In a case where the current communication amount described above is equal to or greater than the communication amount threshold or in a case where the data amount of the update program relating to the update notification is equal to or greater than the data amount threshold, the control unit 20 ends the processing, for example. The update of the program of the onboard ECU 3 (the acquisition of the update program) is put on hold until the communication path via the charging control apparatus 7 described below is selected. By taking into account the communication amount and the data amount, the communication amount of the outside-vehicle communication apparatus 1 can be reduced. In other words, costs for communication of the outside-vehicle communication apparatus 1 can be saved (reduced). For example, in a case where the communication by the outside-vehicle communication apparatus 1 is a paid communication service and the communication service is uncontracted, the control unit 20 ends processing.

In a case where the charging control apparatus 7 can communicate with the charging apparatus 9 (yes in S31), the control unit 20 selects the communication path via the charging control apparatus 7 and further selects, from among the communication paths, either the communication path using the power supply line 92 or the communication path using the wireless communication apparatus 70. Specifically, the control unit 20 determines whether or not the charging apparatus 9 and the vehicle C are connected via the power supply line 92 on the basis of the acquired information relating to the charge state (S33). In a case where charging control apparatus 7 can communicate with the charging apparatus 9, a connection between the vehicle C and the charging apparatus 9 via the power supply line 92 and/or communication between the wireless communication apparatus 70 and the charging apparatus 9 are established, this corresponding to a case where the vehicle C can be charged. In a case where the charging apparatus 9 and the vehicle C are not connected via the power supply line 92 (no in S33), in other words only communication between the wireless communication apparatus 70 and the charging apparatus 9 is established, the control unit 20 selects the communication path using the wireless communication apparatus 70 (S34) and returns to the main routine.

In a case where the charging apparatus 9 and the vehicle C are connected via the power supply line 92 (yes in S33), the control unit 20 selects the communication path using the power supply line 92 (S35) and returns to the main routine. In a case where a connection between the vehicle C and the charging apparatus 9 via the power supply line 92 and communication between the wireless communication apparatus 70 and the charging apparatus 9 are both established, the control unit 20 may select a communication path on the basis of the communication protocols (communication methods) of the communication paths. For example, the control unit 20 may select the communication path using the communication protocol with the fastest communication speed. For example, power line communication is included in communication of the communication path using the power supply line 92. In other words, in the communication of the communication path using the power supply line 92, the communication protocol for the power line communication is used. Wireless communication using Wi-Fi is included in communication of the communication path using the wireless communication apparatus 70. In other words, in the communication of the communication path using the wireless communication apparatus 70, Wi-Fi is used as the communication protocol. Typically, wireless communication using Wi-Fi is faster than power line communication. Thus, the control unit 20 selects the communication path using the wireless communication apparatus 70.

Here, the control unit 20 selected the communication path using the subroutine for selecting the communication path, but the communication path may be selected in accordance with a preset communication path priority order. In this case, a priority order table is stored in the storage unit 21, for example. FIG. 8 is a conceptual diagram illustrating an example of the contents of the priority order table. In the priority order table of FIG. 8, the communication path via the outside-vehicle communication apparatus 1, the communication path using the power supply line 92, and the communication path using the wireless communication apparatus 70 are associated together with a communication path priority order and stored. The communication path priority order may be discretionarily set and may be set at the time of manufacture of the onboard update apparatus 2 or may be set by input to the input apparatus 51 (operation of the input apparatus 51) by the operator of the vehicle C, for example. The communication path priority order may be set for each target onboard ECU 3 for updating, for example. For the onboard ECU 3 with a large data amount for the program, because it can be expected that the data amount of the update program is also large, the priority order of the communication path via the outside-vehicle communication apparatus 1 can be set low. The control unit 20 selects the communication path on the basis of a predetermined selection condition. The predetermined selection condition, for example, includes a condition using the information relating to the charge state and the communication path priority order (priority order table) described above.

The control unit 20 may select the communication path in response to an input to the input apparatus 51 by the operator of the vehicle C. Specifically, instead of executing the subroutine for selecting the communication path, the control unit 20 outputs first selection screen data constituting a first selection screen for selecting the communication path to the first display apparatus 50. The first selection screen data is stored in the storage unit 21, for example. The first display apparatus 50 acquires the output first selection screen data and displays the first selection screen. Three communication paths, i.e., the communication path via the outside-vehicle communication apparatus 1, the communication path using the power supply line 92, and the communication path using the wireless communication apparatus 70, are displayed on a first display screen. For example, a message saying "not available for communication" is displayed on any one of the three communication paths that cannot be used. The operator of the vehicle C selects (inputs) a communication path via operation of the input apparatus 51. A communication path that cannot be used cannot be selected at this time. Only the communication paths that can be used may be displayed on the first selection screen. The control unit 20 selects the communication path input by the operator of the vehicle C.

The control unit 20 uses the selected communication path, communicates with the external server 100 as described above, and acquires the update program from the external server 100 (S23). In a case where the storage unit 31 of the target onboard ECU 3 for updating has one region storage, the acquired update program is stored in the storage unit 21. In a case where the storage unit 31 of the target onboard ECU 3 for updating has two region storage, the acquired update program is transmitted to the onboard ECU 3 and stored in the non-operation region of the storage unit 31 of the onboard ECU 3. In a case where communication with the external server 100 using the selected communication path is interrupted, the control unit 20 may again select a communication path. The control unit 20 restarts communication with the external server 100 using the newly selected communication path.

The control unit 20 determines whether or not the battery 8 (the vehicle C) can be charged (S24). In a case where the battery 8 (the vehicle C) cannot be charged (no in S24), the control unit 20 outputs update consent screen data constituting the update consent screen described above to the first display apparatus 50 (S25). The update consent screen data is included in the consent screen data. The first display apparatus 50 acquires the output update consent screen data and displays the update consent screen. As illustrated in FIG. 7, a button for receiving update consent and a message saying "Executing ECU program update" are included on the update consent screen, for example. When the operator of the vehicle C performs an input to the input apparatus 51, for example, the control unit 20 receives update consent and executes the processing of S28 described below. The program of the onboard ECU 3 described below can be updated after receiving the consent of the user, for example the operator of the vehicle C. In a case where there is no input for update consent for a certain amount of time or longer, the control unit 20 may end the processing.

In a case where the battery 8 (the vehicle C) can be charged (yes in S24), the control unit 20 outputs update and charge consent screen data constituting the update and charge consent screen described above to the first display apparatus 50 (S26). The update and charge consent screen data is included in the consent screen data. The first display apparatus 50 acquires the output update and charge consent screen data and displays the update and charge consent screen. As illustrated in FIG. 7, a button for collectively receiving update consent and charge consent and a message saying "Executing ECU program update and battery charging" are included on the update and charge consent screen, for example. When the operator of the vehicle C performs an input to the input apparatus 51, for example, the control unit 20 collectively receives update consent and charge consent. In other words, update consent and charge consent are received simultaneously or in parallel. The vehicle C can be charged as described below and the program of the onboard ECU 3 can be updated as described below after receiving the consent of the operator of the vehicle C. In a case where there is no input for update consent and charge consent for a certain amount of time or longer, the control unit 20 may end the processing. By displaying the update and charge consent screen, update consent and charge consent can be collectively given. This allows receiving update consent and charge consent to be simplified. In other words, the operator of the vehicle C does not need to separately give update consent and charge consent. The operator of the vehicle C, with a single operation, such as a one-click operation, can give update consent and charge consent.

The control unit 20 causes the charging control apparatus 7 to start charging the battery 8. For example, the control unit 20 outputs an instruction to the charging control apparatus 7 to start charging the battery 8. The charging control apparatus 7 charges (starts to charge) the battery 8 when the instruction is acquired. The processing to output the instruction is included in the processing for charging the vehicle C.

For example, in a case where the vehicle C can be charged but the update program is not prepared in the external server 100, the control unit 20 outputs, to the first display apparatus 50, the charge consent screen data constituting the charge consent screen instead of the update and charge consent screen data. The charge consent screen data is included in the consent screen data. The first display apparatus 50 acquires the output charge consent screen data and displays the charge consent screen. As illustrated in FIG. 7, a button for receiving charge consent and a message saying "Executing battery charging" are included on the charge consent screen, for example. When the operator of the vehicle C performs an input to the input apparatus 51, for example, the control unit 20 receives charge consent. The control unit 20 causes the charging control apparatus 7 to start charging the battery 8. The vehicle C can be charged after receiving the consent of the operator of the vehicle C. In a case where there is no input for charge consent for a certain amount of time or longer, the control unit 20 may end the processing.

Even in a case where the vehicle C can be charged and the target onboard ECU 3 for updating is a charging ECU, the control unit 20 outputs the update consent screen data. In a case where the target onboard ECU 3 for updating is a charging ECU, because the function of the charging ECU is stopped to update the program, the battery 8 cannot be charged. In this case, for example, the control unit 20 outputs the charge consent screen data after completion of the update of the program of the charging ECU.

The consent screen data (the update consent screen data, the charge consent screen data, and the update and charge consent screen) are stored in advance in the storage unit 21 at the time of manufacturing of the onboard update apparatus 2, for example. The first display apparatus 50 may store the consent screen data. The first display apparatus 50 acquires the instruction to display the consent screen transmitted from the control unit 20 and displays the consent screen. The charging apparatus 9 may store the consent screen data and may transmit the consent screen data to the onboard update apparatus 2.

The control unit 20 outputs the second notification data for notifying that the vehicle C is being charged to the second display apparatus 52 (S27). The second display apparatus 52 notifies that the vehicle C is being charged. These details are described below.

The control unit 20 updates the program of the onboard ECU 3 (S28). Specifically, in a case where the target onboard ECU 3 for updating has one region storage, the control unit 20 transmits the update program to the onboard ECU 3. The transmitted update program is stored in the storage unit 31 of the target onboard ECU 3 for updating and adopted by the onboard ECU 3. In other words, the program of the onboard ECU 3 is updated. In a case where the target onboard ECU 3 for updating has two region storage, the update program is stored in the non-operation region of the storage unit 31 of the onboard ECU 3. The control unit 20 requests the control unit 30 of the onboard ECU 3 to switch between the operation region and the non-operation region of the storage unit 31. By switching between the operation region and the non-operation region of the storage unit 31, the update program is adopted by the onboard ECU 3. In other words, the program of the onboard ECU 3 is updated.

The control unit 20 outputs the first notification data for notifying that the program of the onboard ECU 3 is being updated to the second display apparatus 52 (S29). For example, the second display apparatus 52 is provided with two LED lamps. The word "Charge" is displayed on one of the LED lamps or at a position near the LED lamp. For example, a sticker marked with the word "Charge" is attached. The word "Update" is displayed on the other one of the LED lamps or at a position near the LED lamp. In a case where the output first notification data is acquired by the second display apparatus 52, the second display apparatus 52 lights up the LED lamp where "Update" is displayed. In a case where the output second notification data is acquired by the second display apparatus 52, the second display apparatus 52 lights up the LED lamp where "Charge" is displayed. In a case where only charging of the vehicle C is performed, the LED lamp where "Charge" is displayed lights up. In a case where only updating of the program of the onboard ECU 3 is performed, the LED lamp where "Update" is displayed lights up. In a case where both charging of the vehicle C and updating of the program of the onboard ECU 3 are performed, both the LED lamp where "Charge" is displayed and the LED lamp where "Update" is displayed light up. Because the second display apparatus 52 is attached at a position visible from the outside of the vehicle C, combinations of on and off of the LED lamps can be used to notify a person outside of the vehicle C that the vehicle C is being charged and/or that the program of the onboard ECU 3 is being updated. The person outside of the vehicle C is, for example, the operator of the vehicle C having left the vehicle C.

For example, the control unit 20 may treat communication with the external server 100 as part of the update processing and, after the communication path selection in S22, output the first notification data. This allows a person outside of the vehicle C to be notified that the vehicle C is performing communication (that the update program is being downloaded). The number of LED lamps is not limited to two and may be three or more. For example, the second display apparatus 52 may be provided with three LED lamps, i.e., an LED lamp with "Charge" displayed, an LED lamp with "Update" displayed, and an LED lamp with "Communication" displayed. The control unit 20, after the communication path selection of S22, may output third notification data for notifying that the vehicle C is performing communication to the second display apparatus 52. In a case where the output third notification data is acquired by the second display apparatus 52, the second display apparatus 52 lights up the LED lamp where "Communication" is displayed. By lighting up the LED lamp where "Communication" is displayed, a person outside of the vehicle C can be notified that the vehicle C is performing communication.

Notifications may be given via a combination of the LED lamps lighting up, flashing, or being off. For example, in a case where the selected communication path is the communication path via the outside-vehicle communication apparatus 1, fourth notification data for notifying that the communication path is the communication path via the outside-vehicle communication apparatus 1 is output by the control unit 20 to the second display apparatus 52. In a case where the output fourth notification data is acquired by the second display apparatus 52, the second display apparatus 52 lights up the LED lamp where "Communication" is displayed. In a case where the selected communication path is the communication path via the charging control apparatus 7, fifth notification data for notifying that the communication path is the communication path via the charging control apparatus 7 is output by the control unit 20 to the second display apparatus 52. In a case where the output fifth notification data is acquired by the second display apparatus 52, the second display apparatus 52 flashes the LED lamp where "Communication" is displayed. The output fifth notification data may be different depending on whether communication via the communication path using the power supply line 92 is performed or whether communication via the communication path using the wireless communication apparatus 70 is performed. For example, depending on the acquired fifth notification data (depending on whether communication is via the communication path using the power supply line 92 or via the communication path using the wireless communication apparatus 70), the interval between flashes of the LED lamp where "Communication" is displayed made different by the second display apparatus 52. By lighting up or flashing the LED lamp where "Communication" is displayed, a person outside of the vehicle C can be notified of the communication path being used in the communication between the vehicle C and the external server.

After completion of the update of the program of the target onboard ECU 3 for updating, the control unit 20 acquires the update complete notification transmitted from the onboard ECU 3 and causes the second display apparatus 52 to turn off the LED lamp where "Update" is displayed. After completion of the charging of the vehicle C, the control unit 20 acquires the charge complete notification transmitted from the charging control apparatus 7 and causes the second display apparatus 52 to turn off the LED lamp where "Charge" is displayed. The control unit 20 ends the processing.

The onboard update apparatus 2 selects the communication path from among the plurality of communication paths and communicates with the external server 100 via the selected communication path. The control unit 20 of the onboard update apparatus 2 can select the communication path via the outside-vehicle communication apparatus 1, communicate with the external server 100, and acquire the update program. By the control unit 20 selecting the communication path via the charging control apparatus 7, when the vehicle C is charged using the charging apparatus 9, the control unit 20 can communicate with the external server 100 via the charging control apparatus 7 and the charging apparatus 9 and acquire the update program. By selecting the communication path via the charging control apparatus 7, the communication amount relating to communication via the outside-vehicle communication apparatus 1 and communication costs can be saved. The battery 8 can be charged in parallel with updating the program of the onboard ECU 3. This helps prevent the update failing due to a lack of power in the vehicle C when updating the program of the onboard ECU 3.

The control unit 20 can select the communication path via power line communication using the power supply line 92. Because the charging control apparatus 7 and the charging apparatus 9 have a wired connection via the power supply line 92, communication (wired communication) with high stability can be performed.

The control unit 20 can select the communication path using the wireless communication apparatus 70 from among the plurality of communication paths. For example, even in a case where the charging apparatus 9 supplies power to the vehicle C using a non-contact method, the control unit 20 can communicate with the external server 100 via the charging control apparatus 7 and the charging apparatus 9 that perform wireless communication using the wireless communication apparatus 70 and acquire the update program.

The wireless communication apparatus 70 may wirelessly communicate with a non-illustrated wireless communication device capable of communication with the outside-vehicle network N. The wireless communication device includes a communication terminal, such as a wireless LAN router (Wi-Fi router) install in the home of the operator of the vehicle C, a portable wireless LAN router carried by the operator of the vehicle C, a smart phone carried by the operator of the vehicle C, or the like, or a communication apparatus relating to a public wireless LAN. The update program can be acquired via communication with the external server 100 using the communication path via the wireless communication device. In other words, communication paths via these wireless communication devices are included in the plurality of communication paths. The outside-vehicle communication apparatus 1 may communicate using a communication protocol such as Wi-Fi, Bluetooth, or the like or may wirelessly communicate with the wireless communication unit 90 of the charging apparatus 9 or the wireless communication device described above.

In a case where communication between the wireless communication apparatus 70 and a communication terminal, such as a smart phone, carried by the operator of the vehicle C is established, the communication terminal can be used instead of the first display apparatus 50 and the input apparatus 51. For example, in a case where the consent screen data is output, the consent screen is displayed on the screen of the communication terminal. The operator of the vehicle C can input charge consent and update consent by operating the communication terminal.

Second Embodiment

For the configuration according to the second embodiment, components similar to that in the first embodiment are given the same reference sign and detailed descriptions thereof are omitted.

By executing the control program stored in the storage unit 21, the control unit 20 of the onboard update apparatus 2 according to the second embodiment functions as a third acquisition unit that acquires the state of charge (SOC) of the battery 8, i.e., the state of charge of the vehicle C. By executing the control program stored in the storage unit 21, the control unit 20 functions as a determination unit that determines the priority order (priority order between charging and updating) between charging the vehicle C and updating the program of the onboard ECU 3.

A threshold (hereinafter referred to as a determination threshold) used in determining the priority order between charging and updating is stored in the storage unit 21. The determination threshold in a case where the target onboard ECU 3 for updating is a charging ECU is less than the threshold in a case where the target onboard ECU 3 for updating is an onboard ECU 3 that is not a charging ECU. The determination threshold in a case where the target onboard ECU 3 for updating is a charging ECU is 40%, for example. The determination threshold in a case where the target onboard ECU 3 for updating is an onboard ECU 3 that is not a charging ECU is 50%, for example. The determination threshold corresponds to a threshold in the claims.

Figure 9:
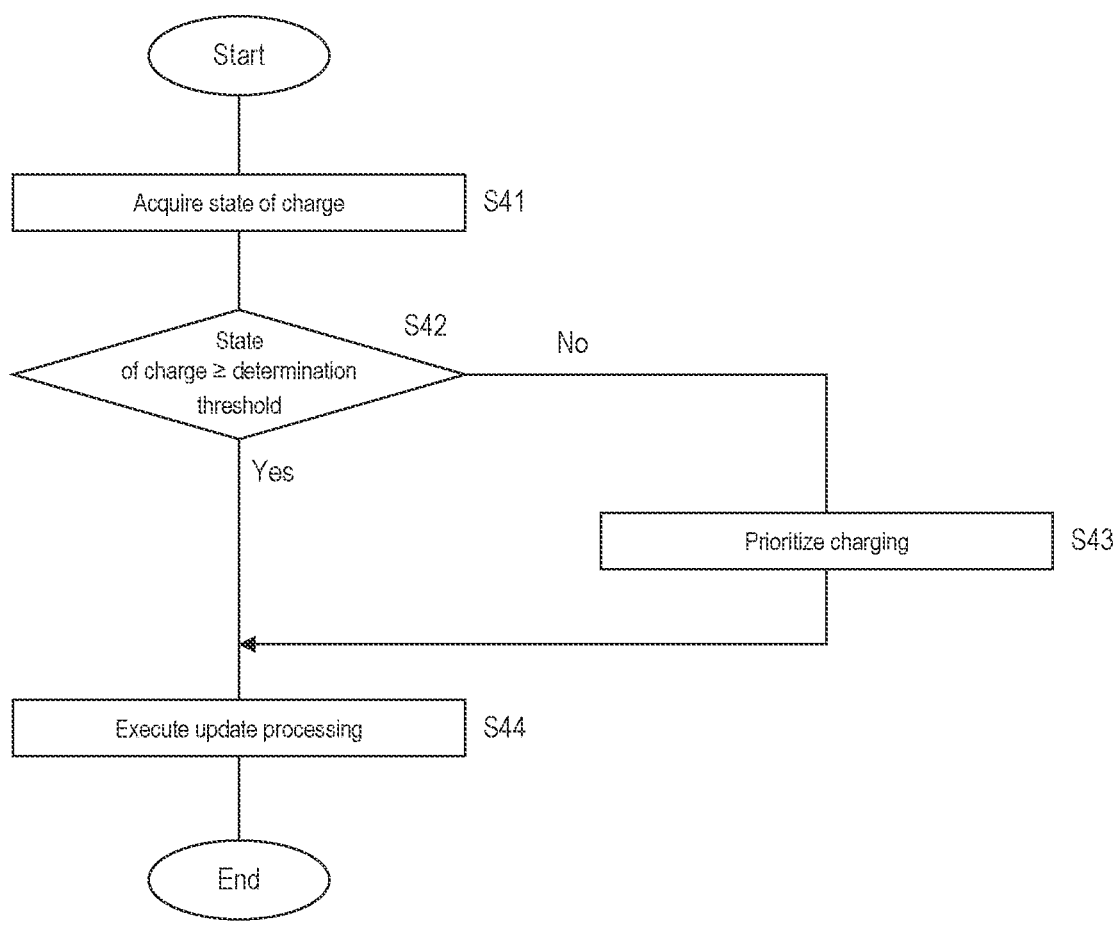
FIG. 9 is a flowchart illustrating an example of the processing relating to determining the priority order between charging and updating executed by the control unit of the onboard update apparatus.

FIG. 9 is a flowchart illustrating an example of the processing relating to determining the priority order between charging and updating executed by the control unit 20 of the onboard update apparatus 2. In a case where the vehicle C is activated (the IG switch 6 is on), the control unit 20 of the onboard update apparatus 2 periodically or non-periodically communicates with the external server 100 via the outside-vehicle communication apparatus 1. In a case where a program or data to be updated, i.e., the update program, is prepared in the external server 100, the control unit 20 executes the following processing. Alternatively, the control unit 20 may execute the following processing on the basis of an update notification from the external server 100 acquired via the outside-vehicle communication apparatus 1. The control unit 20 may execute the following processing on the basis of an update notification being displayed on the first display apparatus 50 and consent for update being entered by the operator of the vehicle C via the input apparatus 51.

When the IG switch 6 is switched of off, the control unit 20 acquires the state of charge of the battery 8 from the charging control apparatus 7 (S41). The control unit 20 determines whether or not the acquired state of charge is equal to or greater than the determination threshold (S42). For example, the information relating to the target onboard ECU 3 for updating is included in the update notification described above. In a case where the target onboard ECU 3 for updating is a charging ECU, the control unit 20 determines whether or not the acquired state of charge is equal to or greater than 40%, for example. In a case where the target onboard ECU 3 for updating is another onboard ECU 3, the control unit 20 determines whether or not the acquired state of charge is equal to or greater than 50%, for example.

In a case where the state of charge of the battery 8 is low, there may not be the necessary power for the processing to update the program of the onboard ECU 3, which includes acquiring the update program and transmitting the update program to the onboard ECU 3, meaning that the update processing (program update) may fail. In a case where the acquired state of charge is equal to or greater than the determination threshold (yes in S42), the control unit 20 executes the processing to update the program of the target onboard ECU 3 for updating (the processing for updating the program of the onboard ECU 3) (S44) and ends the processing. The update program is a program for fixing faults in the current program, for example. Thus, the battery 8 is preferably charged by the charging ECU with the updated program. The determination threshold in a case where the target onboard ECU 3 for updating is a charging ECU is less than the threshold in a case where the target onboard ECU 3 for updating is another onboard ECU 3. Thus, the program of the onboard ECU 3 can be easily updated.

In a similar manner to the processing according to adoption of the update program in the first embodiment, the control unit 20 executes the processing relating to updating the program of the target onboard ECU 3 for updating and processing relating to charging the battery 8. The control unit 20 selects the communication path from among the plurality of communication paths and communicates with the external server 100 via the selected communication path. The control unit 20 acquires the update program from the external server 100. The program of the onboard ECU 3 is updated and the battery 8 is charged as described above. In a case where the target onboard ECU 3 for updating is a charging ECU, the battery 8 is charged after the completion of updating the program of the charging ECU.

In a case where the acquired state of charge is less than the determination threshold (no in S42), the control unit 20 prioritizes charging the battery 8 (S43). In other words, the control unit 20 determines the priority order between updating and charging on the basis of the state of charge and determines that the priority order of charging the battery 8 is higher than the priority order of updating the program of the onboard ECU 3. The control unit 20 outputs the charge consent screen data. The charge consent screen is displayed on the first display apparatus 50. The control unit 20 receives consent relating to charging the vehicle C via the charge consent screen and causes the charging control apparatus 7 to start charging. Charging of the battery 8 is started.

In a case where the control unit 20 periodically acquires the state of charge and the acquired state of charge is equal to or greater than the determination threshold, the control unit 20 executes the processing of S44 and updates the program of the onboard ECU 3. Note that because charging the battery 8 has already started (the battery 8 is already being charged), another charge consent input does not need to be received. In a case where the target onboard ECU 3 for updating is a charging ECU, charging is ended. The program of the charging ECU is updated as described above. For example, charging is restarted after update completion.

In a case where the state of charge of the battery 8 is low, there may not be the necessary power to acquire the update program or update the program of the onboard ECU 3, for example, meaning that acquiring the update program or updating the program of the onboard ECU 3 may fail. Determining the state of charge using the determination threshold (determining the priority order between updating and charging on the basis of the state of charge), helps prevent acquiring the update program or updating the program of the onboard ECU 3 failing due to a low state of charge of the battery 8.

The priority order is not limited to being determined on the basis of the state of charge. The control unit 20 may determine the priority order on the basis of the amount of time required for updating. The amount of time required for updating include the amount of time required to acquire the update program, the amount of time required to adopt the update program, and the like. The amount of time required for updating is included in the update notification, for example. For example, the control unit 20 may communicate with the external server 100 and estimate the amount of time required for updating. For example, in a case where the amount of time required for updating is equal to or greater than a certain amount of time, the battery 8 is charged. The program of the onboard ECU 3 is updated after charge completion. In a case where the amount of time required for updating is less than a certain amount of time, charging and updating are performed in parallel. The determination may be performed using a combination of the determination of the priority order on the basis of the state of charge and the determination of the priority order on the basis of the amount of time required for updating.

The priority order between updating and charging may be set in advance, for example. The priority order between updating and charging, for example, is stored in advance in the storage unit 21 at the time of manufacture of the onboard update apparatus 2. The control unit 20 updates the program of the onboard ECU 3 and charges the battery 8 in accordance with the stored priority order. The priority order between updating and charging may be set for each onboard ECU 3.

Updating the program of the onboard ECU 3 and/or charging the battery 8 may be performed via selection (input) by the operator of the vehicle C. For example, second selection screen data constituting a second selection screen for selection of one from among updating the program of the onboard ECU 3, charging the battery 8, and updating the program of the onboard ECU 3 and charging the battery 8 is output to the first display apparatus 50 by the control unit 20. The first display apparatus 50 acquires the output second selection screen data and displays the second selection screen. The second selection screen includes a button for selecting one from among updating the program of the onboard ECU 3, charging the battery 8, and updating the program of the onboard ECU 3 and charging the battery 8. One from among updating the program of the onboard ECU 3, charging the battery 8, and updating the program of the onboard ECU 3 and charging the battery 8 is selected via operation of the input apparatus 51 by the operator of the vehicle C. The control unit 20 updates the program of the onboard ECU 3 and/or charges the battery 8 in accordance with the selection result from the operator of the vehicle C. In a case where communication between the wireless communication apparatus 70 and a communication terminal, such as a smart phone, carried by the operator of the vehicle C is established, the communication terminal can be used instead of the first display apparatus 50 and the input apparatus 51.

The embodiments disclosed herein are examples in all respects and should not be interpreted as limiting in any manner. The scope of the present disclosure is defined not by the foregoing description, but by the scope of the claims, and all modifications that are equivalent to or within the scope of the claims are included.

The invention claimed is:

1. An onboard update apparatus that acquires an update program transmitted from an external server outside of a vehicle and executes processing for updating a program of an onboard electronic control unit (ECU) installed in the vehicle, the onboard update apparatus comprising:
a control unit configured to control the processing for updating the program of the onboard ECU, wherein
the onboard update apparatus is communicatively connected to the external server outside of the vehicle via a plurality of communication paths;
the plurality of communication paths include
a communication path via a charging control apparatus that controls charging of the vehicle by a charging apparatus outside of the vehicle capable of communication with the external server outside of the vehicle, and
a communication path via an outside-vehicle communication apparatus installed in the vehicle and capable of communication with the external server outside of the vehicle;
the control unit selects one communication path from among the plurality of communication paths on a basis of information relating to a charge state of the vehicle acquired from the charging control apparatus; and
the update program is acquired from the external server outside of the vehicle via the selected communication path from among the plurality of communication paths; and
wherein the control unit acquires the information relating to the charge state of the vehicle acquired from the charging control apparatus; the information relating to the charge state of the vehicle includes information relating to whether or not the vehicle can be charged; the control unit selects the communication path via the charging control apparatus in a case where the vehicle can be charged; and the control unit selects the communication path via the outside-vehicle communication apparatus in a case where the vehicle cannot be charged.

2. The onboard update apparatus according to claim 1, wherein the communication path via the charging control apparatus includes a communication path via power line communication using a power supply line connecting the charging control apparatus and the charging apparatus.

3. The onboard update apparatus according to claim 1, wherein the communication path via the charging control apparatus includes a communication path using a wireless communication apparatus that wirelessly communicates with the charging apparatus and is communicatively connected to the charging control apparatus.

4. The onboard update apparatus according to claim 1, wherein when the program of the onboard ECU is updated and the vehicle is charged, the control unit outputs consent screen data constituting a consent screen for receiving consent relating to updating the program of the onboard ECU and consent relating to charging the vehicle; and
in a case where consent relating to updating the program of the onboard ECU and consent relating to charging the vehicle is received at the consent screen, the control unit executes processing for updating the program of the onboard ECU and processing for charging the vehicle.

5. The onboard update apparatus according to claim 1, wherein when the program of the onboard ECU 1s updated, the control unit outputs first notification data for notifying that the program of the onboard ECU is being updated; and
when the vehicle is charged, the control unit outputs second notification data for notifying that the vehicle is being charged.

6. An update processing program product comprising a non-transitory machine-readable storage medium storing instructions which, when executed by at least one programmable processor, cause the at least one programmable processor to acquire an update program transmitted from an external server outside of a vehicle and causes the at least one programmable processor to execute processing for updating a program of an onboard electronic control unit (ECU) installed in the vehicle, the instructions which, when executed by the at least one programmable processor, cause the at least one programmable processor to further perform operations comprising:
selecting one communication path from among a plurality of communication paths capable of communicating with the external server outside of the vehicle on a basis of information relating to a charge state of the vehicle acquired from a charging control apparatus, wherein the plurality of communication paths include a communication path via the charging control apparatus that controls charging of the vehicle by a charging apparatus outside of the vehicle capable of communication with the external server outside of the vehicle and a communication path via an outside-vehicle communication apparatus installed in the vehicle and capable of communication with the external server outside of the vehicle; and wherein the control unit acquires the information relating to the charge state of the vehicle acquired from the charging control apparatus; the information relating to the charge state of the vehicle includes information relating to whether or not the vehicle can be charged; the control unit selects the communication path via the charging control apparatus in a case where the vehicle can be charged; and the control unit selects the communication path via the outside-vehicle communication apparatus in a case where the vehicle cannot be charged; and acquiring the update program from the external server outside of the vehicle via the selected communication path from among the plurality of communication paths.

7. An update method for acquiring an update program transmitted from an external server outside of a vehicle and executing processing for updating a program of an onboard electronic control unit (ECU) installed in the vehicle, the update method comprising:

selecting one communication path from among a plurality of communication paths capable of communicating with the external server outside of the vehicle on a basis of information relating to a charge state of the vehicle acquired from a charging control apparatus, wherein the plurality of communication paths include a communication path via the charging control apparatus that controls charging of the vehicle by a charging apparatus outside of the vehicle capable of communication with the external server outside of the vehicle and a communication path via an outside-vehicle communication apparatus installed in the vehicle and capable of communication with the external server outside of the vehicle; and wherein the control unit acquires the information relating to the charge state of the vehicle acquired from the charging control apparatus; the information relating to the charge state of the vehicle includes information relating to whether or not the vehicle can be charged; the control unit selects the communication path via the charging control apparatus in a case where the vehicle can be charged; and the control unit selects the communication path via the outside-vehicle communication apparatus in a case where the vehicle cannot be charged; and acquiring the update program from the external server outside of the vehicle via the selected communication path from among the plurality of communication paths.

8. An onboard update apparatus that acquires an update program transmitted from an external server outside of a vehicle and executes processing for updating a program of an onboard electronic control unit (ECU) installed in the vehicle, the onboard update apparatus comprising:

a control unit configured to control the processing for updating the program of the onboard ECU, wherein the onboard update apparatus is communicatively connected to the external server outside of the vehicle via a plurality of communication paths;

the plurality of communication paths include
a communication path via a charging control apparatus that controls charging of the vehicle by a charging apparatus outside of the vehicle capable of communication with the external server outside of the vehicle, and a communication path via an outside-vehicle communication apparatus installed in the vehicle and capable of communication with the external server outside of the vehicle;

the control unit selects one communication path from among the plurality of communication paths on a basis of information relating to a charge state of the vehicle acquired from the charging control apparatus; and the update program is acquired from the external server outside of the vehicle via the selected communication path from among the plurality of communication paths; and wherein the control unit acquires a state of charge of the vehicle; the control unit executes processing for updating the program of the onboard ECU in a case where the state of charge acquired is equal to or greater than a preset threshold; and the preset threshold in a case where the onboard ECU which is a target for updating is the onboard ECU relating to charging is less than the preset threshold in a case where the onboard ECU which is a target for updating is another onboard ECU.

* * * * *